(12) United States Patent
Ogushi et al.

(10) Patent No.: US 7,398,164 B2
(45) Date of Patent: Jul. 8, 2008

(54) SENSOR NETWORK SYSTEM, BASE STATION, AND METHOD TO FORWARD MEASURED DATA

(75) Inventors: Munoru Ogushi, Kokubunji (JP); Keiro Muro, Koganei (JP); Hiroyuki Ota, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/677,128

(22) Filed: Feb. 21, 2007

(65) Prior Publication Data
US 2007/0210916 A1  Sep. 13, 2007

(30) Foreign Application Priority Data
Mar. 7, 2006  (JP) ............................ 2006-061732

(51) Int. Cl.
*G06F 19/00* (2006.01)
(52) U.S. Cl. ............................ 702/42; 700/28; 700/95; 700/97; 700/105; 700/107; 700/182; 705/7; 705/10; 705/27; 705/29
(58) Field of Classification Search .................. 702/42; 700/28, 95, 97, 105; 705/7, 10, 27, 29
See application file for complete search history.

(56) References Cited
U.S. PATENT DOCUMENTS
7,016,749 B2 * 3/2006 Kuzumaki et al. ............ 700/97

FOREIGN PATENT DOCUMENTS

| JP | 2006-072908 |   | 3/2003 |
|----|-------------|---|--------|
| JP | 2003-122798 |   | 4/2003 |
| JP | 2003-163712 | * | 6/2003 |
| JP | 2005-018672 |   | 1/2005 |
| JP | 2006-003182 | * | 1/2006 |
| JP | 2006-029931 |   | 2/2006 |

* cited by examiner

*Primary Examiner*—John E. Barlow, Jr.
*Assistant Examiner*—Sujoy Kundu
(74) *Attorney, Agent, or Firm*—Antonelli, Terry, Stout & Kraus, LLP.

(57) ABSTRACT

The object of the invention is to facilitate the entry of a sensor node and the adoption of a protocol in the existing sensor network system effectively utilizing limited resources of radiocommunication. To achieve the object, the following are provided. A sensor node has a radiocommunication unit that transmits a measured value sensed by a sensor and an identifier of a sensor node as binary measured data. A base station has a radiocommunication controller that receives the measured data from the sensor node, a wire communication controller that transmits the received measured data to a server, a conversion definition information selector that selects conversion definition information corresponding to the identifier included in the measured data out of preset plural conversion definition information and a conversion engine that converts the binary measured data to measured data in a text format based upon the selected conversion definition information.

15 Claims, 27 Drawing Sheets

FIG. 5

PFT PROFILE RELATING TABLE

| MAC | SELECTING SORTING | PROFILE ID | SHORT ID |
|---|---|---|---|
| 3F-71-00-0A-03-14 | 0x02 | 0x041 | |
| XX-XX-XX-XX-XX-XX | 0x01 | 0x012 | |
| XX-XX-XX-XX-XX-YY | 0x03 | 0x138 | 0x50 |
| ⋮ | ⋮ | ⋮ | ⋮ |
| ⋮ | ⋮ | ⋮ | ⋮ |
| | | | |

FIG. 6

(2) SLEEP PERIOD SETTING (WIRED ZONE)

MEANING
```
<Command type="write">
    <id type="MAC">00003F710000A0314</id>
    <SleepPeriod>300</SleepPeriod>
</Command>
```
— MAC ADDRESS

SET VALUE

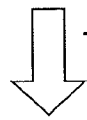 TEXT-TO-BINARY CONVERSION (2') SLEEP PERIOD SETTING (WIRELESS ZONE)      PLD

| 0 | 1 | 2 | 3 |
|---|---|---|---|
| 0 1 2 3 4 5 6 7 | 0 1 2 3 4 5 6 7 | 0 1 2 3 4 5 6 7 | 0 1 2 3 4 5 6 7 |
| "write" (=0x02) | "SleepPeriod" (=0x0503) | | value (=0x012C) |
| value (cont) | | | |

FIG. 8

| SAMPLE NUMBER | | | |
|---|---|---|---|
| No | CLASSIFICATION | SAMPLE | |
| 1 | ACQUIRING TEMPERATURE T | WIRE PACKET TO BE ENCODED | <Command><br>  <Read/><br>  <Temperature/><br></Command> |
| | | ENCODED WIRELESS PACKET | <Read> <Temperature><br>(hex) 01 0101 |
| 2 | ACQUIRING SLEEP PERIOD | WIRE PACKET TO BE ENCODED | <Command><br>  <Read/><br>  <SleepPeriod/><br></Command> |
| | | ENCODED WIRELESS PACKET | <Read> <SleepPeriod><br>(hex) 01 0503 |
| 3 | SETTING SLEEP PERIOD | WIRE PACKET TO BE ENCODED | <Command><br>  <write/><br>  <SleepPeriod/>300</SleepPeriod><br></Command> |
| | | ENCODED WIRELESS PACKET | <Write> <SleepPeriod> <Value><br>(hex) 02 0503 012C |

FIG. 9

| No | SAMPLE | | | DECODING RULE |
|---|---|---|---|---|
| 1 | SENSOR NODE | TRANSMITS TEMPERATURE T | | |
| INTEGRAL SCALAR VALUE | WIRELESS PACKET PAYLOAD | \<Temperature\><br>(hex) 0018 | | |
| | PROFILE DESCRIPTION FOR DECODING | \<sequence type="upPacket" name="observed"\><br>   \<element name="Temperature" dataType="int16u"/\><br>\</sequence\> | | [Rule 0, 2, 3]<br>[Rule 1] |
| | DECODED WIRED ZONE TEXT | \<Event name="observed"\><br>   \<Temperature\>24\</Temperature\><br>\</Event\> | | |
| 2 | SENSOR NODE | TRANSMITS ACCELERATION (x, y, z) | | |
| INTEGRAL VECTOR VALUE | WIRELESS PACKET PAYLOAD | \<X\> \<Y\> \<Z\><br>(hex) 0018 001C 000D | | |
| | PROFILE DESCRIPTION FOR DECODING | \<sequence type="upPacket" name="observed"\><br>  \<sequence name="Acceralate"\><br>    \<element name="X" dataType="int16u"/\><br>    \<element name="Y" dataType="int16u"/\><br>    \<element name="Z" dataType="int16u"/\><br>  \</sequence\><br>\</sequence\> | | [Rule 0, 2, 3]<br>[Rule 2, 3]<br>[Rule 1]<br>[Rule 1]<br>[Rule 1] |
| | DECODED WIRED ZONE TEXT | \<Event name="observed"\><br>  \<Acceralate\><br>    \<X\>24\</X\>\<Y\>28\</Y\>\<Z\>13\</Z\><br>  \</Acceralate\><br>\</Event\> | | |
| 3 | SENSOR NODE | TRANSMITS TEMPERATURE T AND HUMIDITY H | | |
| STRUCTURE | WIRELESS PACKET PAYLOAD | \<Temperature\> \<Humidity\><br>(hex) 001A 0047 | | |
| | PROFILE DESCRIPTION FOR DECODING | \<sequence type="upPacket" name="observed"\><br>  \<element name="Temperature" dataType="int16u"/\><br>  \<element name="Humidity" dataType="int16u"/\><br>\</sequence\> | | [Rule 0, 2, 3]<br>[Rule 1]<br>[Rule 1] |
| | DECODED WIRED ZONE TEXT | \<Event name="observed"\><br>  \<Temperature\>26\</Temperature\><br>  \<Humidity\>71\</Humidity\><br>\</Event\> | | |
| 4 | SENSOR NODE | COLLECTIVELY TRANSMITS 0 OR MORE PIECES OF TEMPERATURE T | | |
| REPETITION OF SIMPLE VALUES | WIRELESS PACKET PAYLOAD | \<Number\> \<Temperature\>*<br>(hex) 03 001A 0019 0017 | | |
| | PROFILE DESCRIPTION FOR DECODING | \<sequence type="upPacket" name="observed" maxOccurs="unbounded"\><br>  \<element name="Temperature" dataType="int16u"/\><br>\</sequence\> | | [Rule 0, 2, 3, 4]<br>[Rule 1] |
| | DECODED WIRED ZONE TEXT | \<Event name="observed"\><br>  \<Temperature\>26\</Temperature\><br>  \<Temperature\>25\</Temperature\><br>  \<Temperature\>23\</Temperature\><br>\</Event\> | | |
| 5 | SENSOR NODE | COLLECTIVELY TRANSMITS 0 OR MORE PIECES OF PAIRS OF OBSERVED TIME AND TEMPERATURE T | | |
| REPETITION OF STRUCTURE | WIRELESS PACKET PAYLOAD | \<Number\> (\<Time\> \<Temperature\>)*<br>(hex) 03 10000000 0019 10000500 0017 10001000 0016 | | |
| | PROFILE DESCRIPTION FOR DECODING | \<sequence type="upPacket" name="observed"\><br>  \<element name="Temperature" maxOccurs="unbounded"/\><br>    \<element name="Time" dataType="time32"/\><br>    \<element name="Value" dataType="int16u"/\><br>  \</sequence\><br>\</sequence\> | | [Rule 0, 2, 3]<br>[Rule 2, 3, 4]<br>[Rule 1]<br>[Rule 1] |
| | DECODED WIRED ZONE TEXT | \<Event name="observed"\><br>  \<Temperature\>\<Time\>10:00:00\</Time\>\<Value\>25\</Value\>\</Temperature\><br>  \<Temperature\>\<Time\>10:00:05\</Time\>\<Value\>23\</Value\>\</Temperature\><br>  \<Temperature\>\<Time\>10:00:10\</Time\>\<Value\>22\</Value\>\</Temperature\><br>\</Event\> | | |

FIG. 10

| | No | SAMPLE | | DECODING RULE |
|---|---|---|---|---|
| SELECTION OF SIMPLE VALUE | 6 | SENSOR NODE | TRANSMITS TEMPERATURE T OR HUMIDITY H | |
| | | WIRELESS PACKET PAYLOAD | \<Type\> \<Temperature\> \| \<Humidity\><br>(hex) 01  001A | |
| | | | (hex) 02  0047 | |
| | | PROFILE DESCRIPTION FOR DECODING | \<sequence type="upPacket" name="observed"\><br>  \<choice\><br>    \<element id="01" name="Temperature" dataType="int16u"/\><br>    \<element id="02" name="Humidity" dataType="int16u"/\><br>  \</choice\><br>\</sequence\> | [Rule 0, 2, 3]<br>[Rule 5]<br>[Rule 1, 6]<br>[Rule 1, 6] |
| | | DECODED WIRED ZONE TEXT | \<Event name="observed"\><br>  \<Temperature\>26\</Temperature\><br>\</Event\> | |
| | | | \<Event name="observed"\><br>  \<Humidity\>71\</Humidity\><br>\</Event\> | |
| SELECTION OF STRUCTURE | 7 | SENSOR NODE | TRANSMITS (OBSERVED TIME AND TEMPERATURE T) OR (OBSERVED TIME AND HUMIDITY H) | |
| | | WIRELESS PACKET PAYLOAD | \<Type\> (\<Time\> \<Temperature\>) \| (\<Time\> \<Humidity\>)<br>(hex) 01  10000101  001A | |
| | | | (hex) 02  10000200  0047 | |
| | | PROFILE DESCRIPTION FOR DECODING | \<sequence type="upPacket" name="observed"\><br>  \<choice\><br>    \<sequence id="01"\><br>      \<element name="Time" dataType="time32"/\><br>      \<element name="Temperature" dataType="int16u"/\><br>    \</sequence\><br>    \<sequence id="02"\><br>      \<element name="Time" dataType="time32"/\><br>      \<element name="Humidity" dataType="int16u"/\><br>    \</sequence\><br>  \</choice\><br>\</sequence\> | [Rule 0, 2, 3]<br>[Rule 5]<br>[Rule 2, 6]<br>[Rule 1]<br>[Rule 1]<br><br>[Rule 2, 6]<br>[Rule 1]<br>[Rule 1] |
| | | DECODED WIRED ZONE TEXT | \<Event name="observed"\><br>  \<Time\>10:00:00\</Time\><br>  \<Temperature\>26\</Temperature\><br>\</Event\> | |
| | | | \<Event name="observed"\><br>  \<Time\>10:00:00\</Time\><br>  \<Humidity\>71\</Humidity\><br>\</Event\> | |

(No = SAMPLE NUMBER)

FIG. 11

SAMPLE NUMBER

| No | | SAMPLE | | DECODING RULE |
|---|---|---|---|---|
| 8 | REPETITION OF SELECTED STRUCTURE | SENSOR NODE | COLLECTIVELY TRANSMITS 0 OR MORE PIECES OF (OBSERVED TIME AND TEMPERATURE T) OR (OBSERVED TIME AND HUMIDITY H) | |
| | | WIRELESS PACKET PAYLOAD | <number> (<Type> (<Time> <Temperature>) \| (<Time> <Humidity>))* <br> (hex) 04 (01  10000100  001A) (02  10000200  0046) <br>             (01  10000300  001B) (02  100000400  0047) | |
| | | PROFILE DESCRIPTION FOR DECODING | <sequence type="upPacket" name="observed"> <br>   <sequence maxOccurs="unbounded"> <br>     <choice> <br>       <sequence id="01" name="Temperature"> <br>         <element name="Time" dataType="time32"/> <br>         <element name="Value" dataType="int16u"/> <br>       </sequence> <br>       <sequence id="02" name="Humidity"> <br>         <element name="Time" dataType="time32"/> <br>         <element name="Value" dataType="int16u"/> <br>       </sequence> <br>     </choice> <br>   </sequence> <br> </sequence> | [Rule 0, 2, 3] <br> [Rule 4] <br> [Rule 5] <br> [Rule 2, 3, 6] <br> [Rule 1] <br> [Rule 1] <br><br> [Rule 2, 3, 6] <br> [Rule 1] <br> [Rule 1] |
| | | DECODED WIRED ZONE TEXT | <Event name="observed"> <br>   <Temperature><Time>10:00:01</Time><Value>26</Value></Temperature> <br>   <Humidity>    <Time>10:00:02</Time><Value>70</Value></Humidity> <br>   <Temperature><Time>10:00:03</Time><Value>27</Value></Temperature> <br>   <Humidity>    <Time>10:00:04</Time><Value>71</Value></Humidity> <br> </Event> | |
| 9 | REPETITION OF FIXED TIMES | SENSOR NODE | TRANSMITS PAST FOUR (FIXED) RSSI MEASURED VALUES | |
| | | WIRELESS PACKET PAYLOAD | <RSSI> <RSSI> <RSSI> <RSSI> <br> (hex) 001A  0017  002B  0016 | |
| | | PROFILE DESCRIPTION FOR DECODING | <sequence type="upPacket" name="observed"> <br>   <sequence> <br>     <element name="RSSI" dataType="int16u"/> <br>     <element name="RSSI" dataType="int16u"/> <br>     <element name="RSSI" dataType="int16u"/> <br>     <element name="RSSI" dataType="int16u"/> <br>   </sequence> <br> </sequence> | [Rule 0, 2, 3] <br> [Rule 2] <br> [Rule 1] <br> [Rule 1] <br> [Rule 1] <br> [Rule 1] |
| | | DECODED WIRED ZONE TEXT | <Event name="observed"> <br>   <RSSI>26</RSSI> <br>   <RSSI>23</RSSI> <br>   <RSSI>43</RSSI> <br>   <RSSI>22</RSSI> <br> </Event> | |

FIG. 12

| # | DataType | MEANING | DATA LENGTH |
|---|---|---|---|
| 1 | null | FIXED VALUE | 0 |
| 2 | hex1 | HANDLES 1-BIT VALUE AS HEX INTEGER | 1bit |
| 3 | hex2 | HANDLES 2-BIT VALUE AS HEX INTEGER | 2bit |
| 4 | hex4 | HANDLES 4-BIT VALUE AS HEX INTEGER | 4bit |
| 5 | hex8 | HANDLES 1-BYTE VALUE AS HEX INTEGER | 1byte |
| 6 | hex16 | HANDLES 2-BYTE VALUE AS HEX INTEGER | 2byte |
| 7 | hex32 | HANDLES 4-BYTE VALUE AS HEX INTEGER | 4byte |
| 9 | hex64 | HANDLES 8-BYTE VALUE AS HEX INTEGER | 8byte |
| 10 | int8u | HANDLES 1-BYTE VALUE AS UNSIGNED DECIMAL INTEGER | 1byte |
| 11 | int16u | HANDLES 2-BYTE VALUE AS UNSIGNED DECIMAL INTEGER | 2byte |
| 12 | int32u | HANDLES 4-BYTE VALUE AS UNSIGNED DECIMAL INTEGER | 4byte |
| 13 | int8 | HANDLES 1-BYTE VALUE AS SIGNED DECIMAL INTEGER | 1byte |
| 14 | int16 | HANDLES 2-BYTE VALUE AS SIGNED DECIMAL INTEGER | 2byte |
| 15 | int32 | HANDLES 4-BYTE VALUE AS SIGNED DECIMAL INTEGER | 4byte |
| 16 | time16 | HANDLES 2-BYTE VALUE AS DATE | 2byte |
| 17 | time32 | HANDLES 4-BYTE VALUE AS DATE | 4byte |
| 18 | time64 | HANDLES 8-BYTE VALUE AS DATE | 8byte |
| 19 | mbi | HANDLES AS MULTI BYTE INTEGER | VARIABLE |
| 20 | float32 | HANDLES 32-BIT VALUE AS FLOATING-POINT NUMBER | 4byte |
| 21 | float64 | HANDLES 64-BIT VALUE AS FLOATING-POINT NUMBER | 8byte |
| 22 | mbf | HANDLES AS MULTI BYTE FLOATING-POINT NUMBER | VARIABLE |
| 23 | text1 | HANDLES AS ZERO TERMINAL TEXT | VARIABLE |
| 24 | text2 | HANDLES AS TEXT STORING CHARACTER SIZE IN FIRST 1 BYTE | VARIABLE |

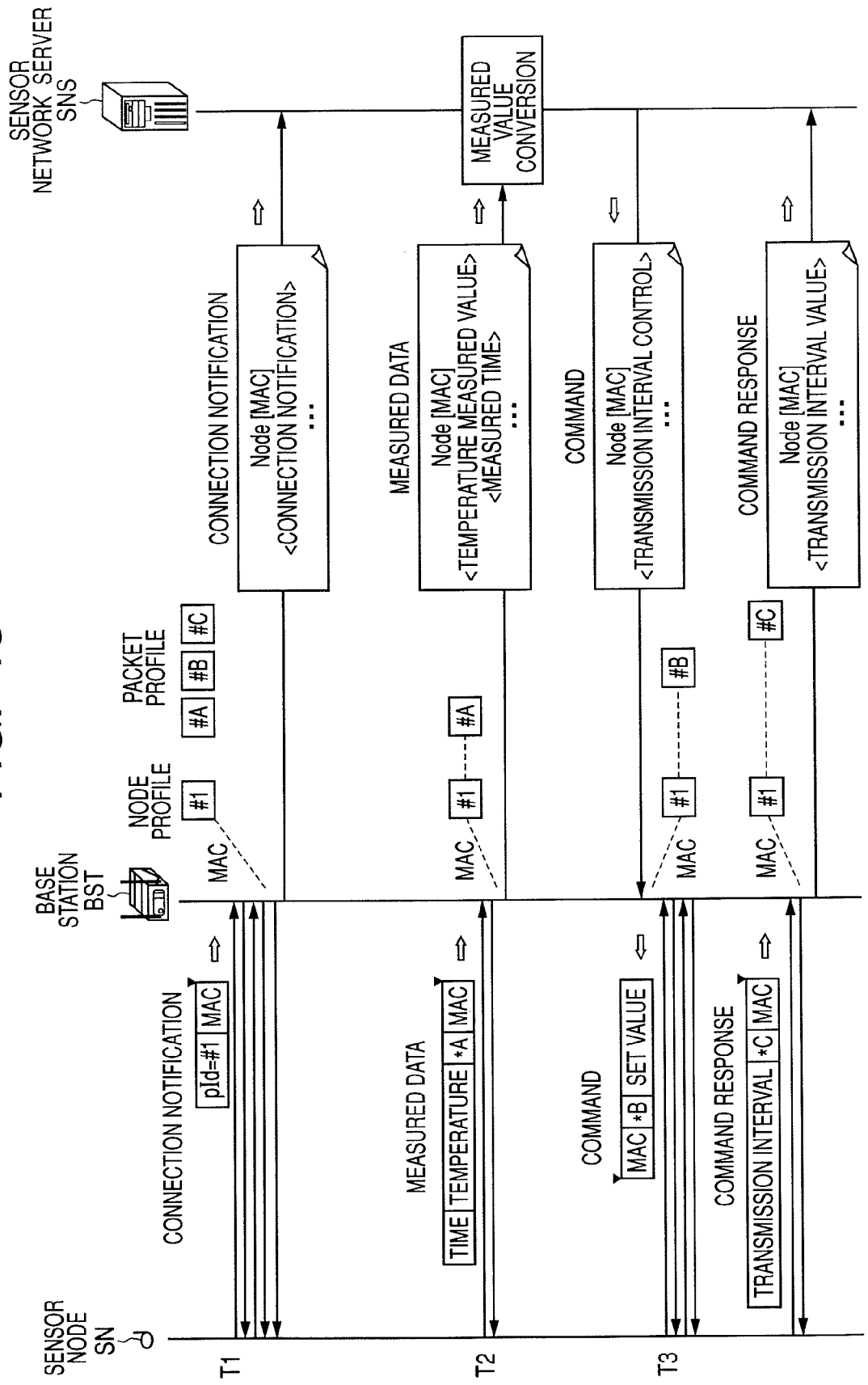

FIG. 15

| FIELD NAME | SIZE | CONTENTS |
|---|---|---|
| type | 1 BYTE | PROFILE ID REFERENCE CLASSIFICATION<br>· 0x01: REFERENCE BY DIRECT VALUE<br>· 0x02: (INDIRECT) REFERENCE BY MAC ADDRESS VALUE<br>· 0x03: INDIRECT REFERENCE BY SHORT ID VALUE<br>· 0x11: INDIRECT REFERENCE BASED UPON CLASSIFICATION OF BASE STATIONS<br>· 0x12: INDIRECT REFERENCE BASED UPON CLASSIFICATION OF WIRELESS STANDARDS |
| length | 1 BYTE | SHOWS SIZE OF id FIELD |
| id | VARIABLE LENGTH ("length VALUE" BYTE) | PROFILE IDENTIFICATION INFORMATION ACCORDING TO type VALUE<br>· type="0x01": PROFILE ID VALUE ITSELF<br>· type="0x02": PROFILE ID VALUE ITSELF<br>· type="0x03": PROFILE ID VALUE ITSELF AND ITS SHORT ID VALUE<br>· type="0x11": BASE STATION IDENTIFICATION INFORMATION<br>· type="0x12": WIRELESS STANDARD IDENTIFICATION INFORMATION |

SENSOR NETWORK SYSTEM, BASE STATION, AND METHOD TO FORWARD MEASURED DATA

CLAIM OF PRIORITY

The present application claims priority from Japanese application JP 2006-061732 filed on Mar. 7, 2006, the content of which is hereby incorporated by reference into this application.

FIELD OF THE INVENTION

The present invention relates to technique for utilizing information from multiple sensors connected to a network.

BACKGROUND OF THE INVENTION

Recently, a network system where a small-sized electronic circuit having a radiocommunication facility is added to a sensor and various pieces of information in the real world is input to an information processor at real time (hereinafter called a sensor network system) is researched. As for the sensor network system, the wide applications are considered, and for example, technique for regularly monitoring biometric information such as a pulse and positional information by a small-sized electronic circuit acquired by integrating a wireless circuit, a processor, a sensor and a battery, transmitting the result of monitoring to a server and others by radiocommunication and determining a condition based upon the result of monitoring is proposed.

To make the sensor network system widely practicable, the electronic circuit where the radiocommunication facility, the sensor and a power source such as the battery are mounted (hereinafter called a sensor node) that requires no maintenance for a long time and can continue to transmit measured data is demanded.

Service on the current Internet is only open to service on virtual space; however, the sensor network system is essentially different from the current Internet in that the sensor network system is in harmony with real space. If the sensor network system can be in harmony with the real space, various service of a type depending upon status such as time and a position can be realized. Traceability can be realized by connecting versatile objects existing in the real space to a network, and social needs demanding safety in wide meaning and needs for making stock management and office work efficient can be coped with (for example, refer to JP-A No. 2003-122798).

SUMMARY OF THE INVENTION

However, in the above-mentioned conventional type sensor network system, a processor such as a gateway and a server for converting unprocessed data output from the sensor node to meaningful data including the classification of data and a unit can process only data in a preset data format.

In future, it is estimated that types of sensor nodes increase and types of sensor nodes participating in the sensor network system also increase. Besides, the adoption of a new communication specification between the sensor node and the gateway of the sensor network system will be demanded.

However, in the conventional type sensor network system, a unique definition (particularly format definition) is used in handling the output of the sensor node with respect to each sensor network system. Therefore, when a new type of sensor node is joined and a new protocol is adopted in the gateway, a definition related to the output of the sensor node and a definition related to the protocol of the gateway are required to be changed with respect to each application software of each sensor network system.

However, to join the new type of sensor node and a different type of sensor node in the existing sensor network system, the definition related to the output of the sensor node is required to be changed in all application software and enormous labor is required. Further, there occurs a problem that every time a new sensor node is joined, a definition related to the output is required to be changed and labor required for the development and the maintenance of application software is enormous.

Particularly, in a large-scale sensor network system having plural gateways and having multiple sensor nodes under each gateway, every time a new type of sensor node and a new protocol are joined, the cost of the development and the maintenance of software increases.

Then, the invention is made in view of the above-mentioned problem, it is premised in the invention that a data format in which a sensor node transmits/receives data is converted to a handier format before the processing in a host server, and the object is to facilitate the entry of a new type of sensor node and the adoption of a new protocol in the existing sensor network system.

The invention is based upon a sensor network system having a gateway connected to plural sensor nodes via a network and a server connected to the gateway via a network, and is characterized in that the sensor node has a communication unit that transmits a measured value sensed by a sensor and an identifier of the sensor node as measured data, the gateway has a first communication controller that receives the measured data from the sensor node and a second communication controller that transmits the received measured data to the server, the server has a database that stores the measured data received via the network, there are provided a profile manager that accepts, holds and manages conversion definition information input from the server, a user terminal or another communication device, a conversion definition information selector that selects conversion definition information corresponding to the identifier included in the measured data out of plural conversion definition information held by the profile manager and a conversion processor that applies a format conversion process set in the selected conversion definition information to the measured data between the gateway and the server or to either of the gateway or the server, and the database stores the converted measured data.

Besides, the conversion definition information includes first conversion definition information for converting the measured data to measured data in a text format, the conversion definition information manager accepts, holds and manages the first conversion definition information input from the server, the user terminal or another communication device, the conversion definition information selector selects first conversion definition information corresponding to the identifier included in the measured data out of the plural first conversion definition information held by the conversion definition information manager, the conversion processor converts the measured data to measured data based upon the selected first conversion definition information, and the database stores the converted measured data.

Therefore, in the invention, a rule for the format conversion of measured data received by a base station via the network can be set with respect to each sensor node or each measured data as a conversion setting definition (a profile or plug-in).

Hereby, a new type of sensor node and a new protocol can be easily adopted without updating the software of the gateway and the server.

As the conversion processor transmits measured data to the network after the conversion processor adds semantic information of the measured data when the conversion processor converts unprocessed measured data received from the sensor node to measured data in the text format based upon conversion definition information, a load of the wireless network having many constraints on resources is reduced and the efficiency of the utilization can be enhanced.

BRIEF DESCRIPTION OF THE DRAWINGS

FIG. 5 is an explanatory drawing showing one example of a profile relating table of the base station in the first embodiment;

FIG. 6 is an explanatory drawing showing downward format conversion executed in the base station and showing one example of a data format converted from command in the text format to binary command in the first embodiment;

FIG. 8 is an explanatory drawing showing one example of a data format before and after conversion used in the downward format conversion executed in the base station in the first embodiment;

FIG. 9 is an explanatory drawing showing one example of a profile used in upward format conversion executed in the base station in the first embodiment;

FIG. 10 is an explanatory drawing showing one example of another profile used in the upward format conversion executed in the base station in the first embodiment;

FIG. 11 is an explanatory drawing showing one example of another profile used in the upward format conversion executed in the base station in the first embodiment;

FIG. 12 is an explanatory drawing showing a data type defined in such a profile in the first embodiment;

FIG. 13 is a time chart showing communication made among a sensor node, the base station and the sensor network server in the first embodiment;

FIG. 15 is an explanatory drawing showing the contents of a data field in the payload of the connection notification packet in the first embodiment;

DETAILED DESCRIPTION OF THE PREFERRED EMBODIMENTS

Referring to the attached drawings, one embodiment of the invention will be described below.

Figure 1:
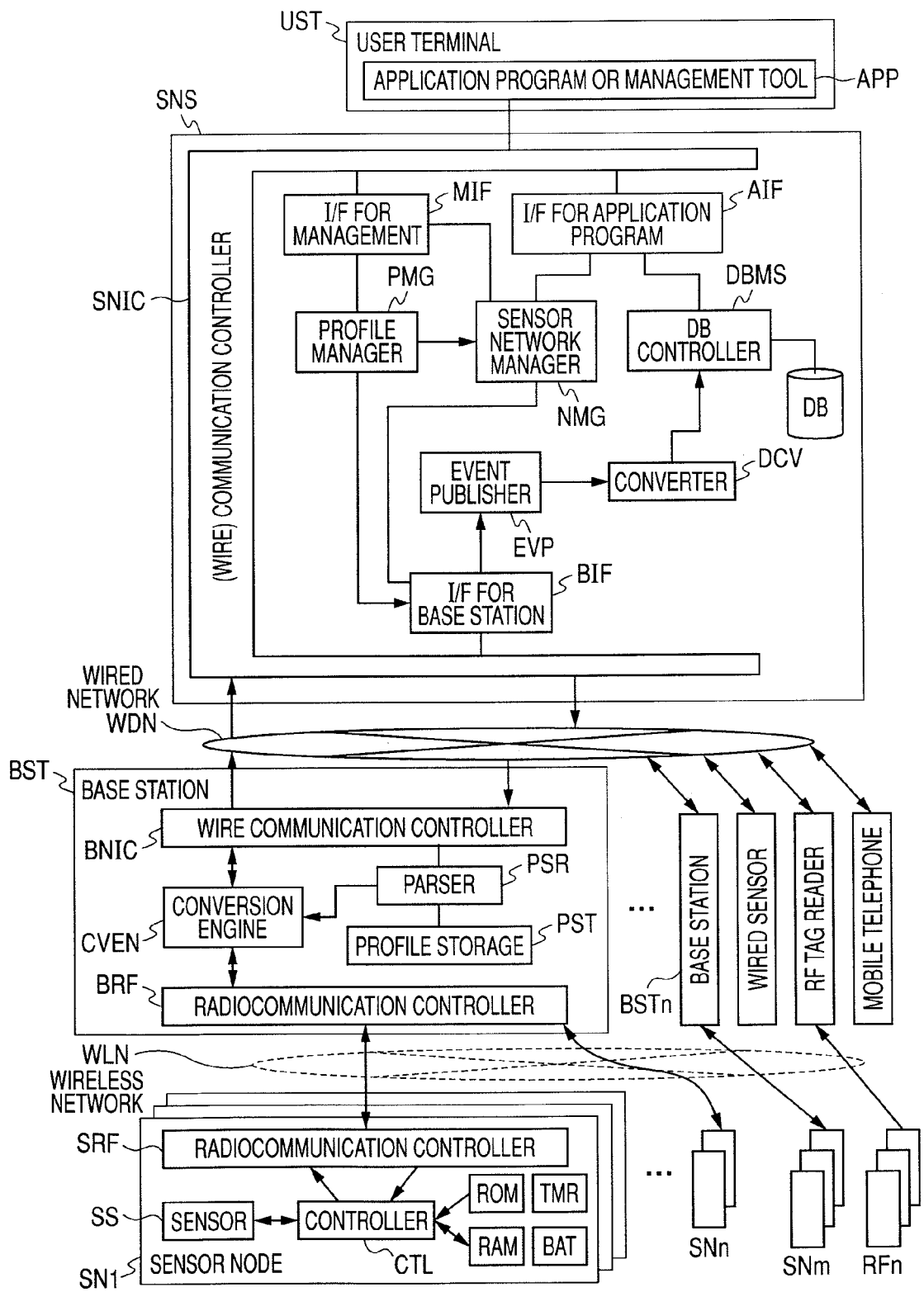
FIG. 1 is a block diagram showing a sensor network system equivalent to a first embodiment of the invention.

FIG. 1 shows a first embodiment and is a block diagram showing one example of a sensor network system to which the invention is applied. In the sensor network system shown in FIG. 1, sensor nodes SN1 to SNn encode a measured value sensed by each sensor SS as specific binary measured data and transmit it to a base station BST by radiocommunication. The base station BST converts the received binary measured data (raw data of each sensor) to measured data in a text format which is a specific format utilizable in the sensor network system (for example, in extended markup language (XML)). In the conversion of formats, measured data in the text format is generated by adding the meaning of measured data according to the classification of the sensor node. In this embodiment, the base station BST transmits the measured data to a sensor network server SNS via a wired network WDN.

The sensor network server SNS receives the measured data from the base station BST, which is in the text format based upon raw data sensed by the sensor, converts it to measured data notated in a value which a person can understand, and stores it in a database DB. According to a request from a user terminal UST or an application program or a management tool of the user terminal UST, the sensor network server SNS provides the measured data which includes semantic information and is stored in the database to the requested client.

<Sensor Node>

As shown in FIG. 1, SN1 to SNn are sensor nodes that output measured data or preset identifier (ID) via radiocommunication. The sensor nodes SN1 to SNn are installed in a specific position of a user to monitor a condition of the user for example. These sensor nodes SN1 to SNn communicate with the base station BST via a wireless network WLN. Each sensor node SN1 to SNn transmits data such as measured temperature and pulse to the base station BST.

Each sensor node SN1 to SNn has a controller CTL that controls the operation of each sensor SS provided to each sensor node SN1 to SNn, a read only memory ROM that stores a program for controlling the operation of each sensor node, a random access memory RAM that stores data and others, a radiocommunication controller SRF that communicates with the base station BST via the wireless network WLN and a timer TMR that counts a specific sleep term and activates the controller CTL every time the sleep term elapses.

Each sensor node SN1 to SNn is driven by a battery BAT and sensing operation is intermittently executed to inhibit the wastage of the battery BAT. That is, the sensor node is activated every time the specific sleep period elapses, its sensor SS is driven, and measurement is performed. After the sensor node transmits binary measured data to the base station BST, it transfers to a sleep condition for the next activation.

For the sensor SS with which each sensor node SN1 to SNn is provided, a temperature sensor, a humidity sensor, a pulse sensor and in addition, a sensor having an identifier for identifying an individual and an individual thing can be given.

An actuator may be also provided to each sensor node SN1 to SNn and for example, an air conditioner is a sensor node of this type.

As described above, in this embodiment, a data format in which the sensor node transmits/receives data is based upon a binary code. A binary format has a problem that it is illegible and that a definition and a processing method are required to be determined beforehand. In the meantime, the binary format has an advantage that it is suitable for processing using low level programming language and that data size is small. To represent a numeric value of 181 for example, only one byte (0xB5) is required in the binary format, while three bytes are required in the text format, and when the legibility is to be more enhanced, data size is further extended. Also in the sensor network system which is an object of the invention, as the sensor node is small-sized, requires only small power, does not require many resources and mainly performs application specific process which is hard-coded, the binary format is suitable for a data format in communication. In the meantime, the server in which measured data from multiple sensor nodes concentrate can plentifully utilize resources such as a communication band, a processor and a memory. Therefore, it is convenient if the text format which uses high-level programming language and which is a data format easier for a person and versatile application programs to utilize can be adopted, and there is effect to apply the configuration of the invention.

<Outline of Base Station>

The base station BST includes a radiocommunication controller BRF that controls radiocommunication with the plural sensor nodes SN1 to SNn under the base station, a wire communication controller BNIC that controls wire communication with the sensor network server SNS, a conversion engine (a format converter) CVEN that converts a format of a packet transmitted/received between the sensor network server SNS and the sensor node SN1 to SNn in two ways, a parser PSR that controls conversion definition information (hereinafter called a profile) PF sent to the conversion engine CVEN and a profile storage PST that stores the profile PF (first conversion definition information) received from a host server (for example, the sensor network server SNS).

The conversion engine CVEN adds the meaning of measured data to an up packet transmitted from the sensor node SN1 to SNn to the sensor network server SNS according to the profile PF (a conversion rule) selected by the parser PSR and converts (decodes) it to the measured data in the text format. The meaning of data added by the conversion engine CVEN of the base station BST means the classification (for example, temperature, humidity and the number of pulses) of measured data received from the sensor node SN1 to SNn. That is, the classification of physical quantity, such as temperature and voltage, is added to binary measured data transmitted from the sensor node SN1 to SNn with respect to each packet or each sensor node.

Besides, the conversion engine CVEN converts (encodes) data (a command) in the text format in a down packet transmitted from the sensor network server SNS to the sensor node SN1 to SNn to binary data according to the profile PF (a conversion rule) selected by the parser PSR. The parser PSR analyzes the contents of the received packet, selects an optimum profile PF in the profile storage PST, and sends it to the conversion engine CVEN as described later.

The profile storage PST stores profiles PF distributed from a host server (for example, the sensor network server SNS). The profiles PF means a conversion rule preset in the sensor network server SNS.

The conversion engine CVEN manages commands sent from the radiocommunication controller BRF so as to determine whether up data transmitted from the sensor node SN1 to SNn to the sensor network server SNS is a response to a command transmitted to the sensor node before or not. When a command is transmitted from a down packet converter DPC to the sensor node SN1 to SNn under it, the command is registered.

Besides, the conversion engine CVEN converts a command in the text format received from the sensor network server SNS to the binary command to be transmitted to each sensor node SN1 to SNn.

In this embodiment, the format of data transmitted/received to/from the sensor node SN1 to SNn is a binary format and the format of data transmitted/received to/from the sensor network server SNS is a text format. For a transformed example of this embodiment, a case that the format of data transmitted/received to/from the sensor network server SNS is a binary format different from the sensor nodes SN1 to SNn and the format of data transmitted/received to/from the sensor nodes SN1 to SNn is a text format different from the sensor network server SNS can be also coped with by the similar configuration. A case that these formats are a format positioned between the binary format and the text format such as BASE64 for encoding binary data in the text format according to a simple rule and a binary coded decimal (BCD) for coding as if binary numeric data is data according to decimal notation can be also coped with by the similar configuration.

As described above, a gateway that can execute versatile format conversions by the similar configuration to that of the base station BST in this embodiment can be realized. As described later, in this application, it can be easily realized to cope with a new format if necessary and to cope with plural independent formats by providing units for setting for format conversion and for the selection of a format, and this application is mainly characterized in that. Format conversion is processing widely executed in a device such as a gateway and a proxy server for relaying communication between devices having different protocols and the effect of completely removing the problem of the related art that the format conversion facility of a specific specification is required to be created with respect to each purpose beforehand is acquired by applying the configuration in this application to the conventional type devices. This effect is maximum particularly in the application to a sensor network system that is required to handle sensors and sensor nodes having various specifications.

Figure 2:
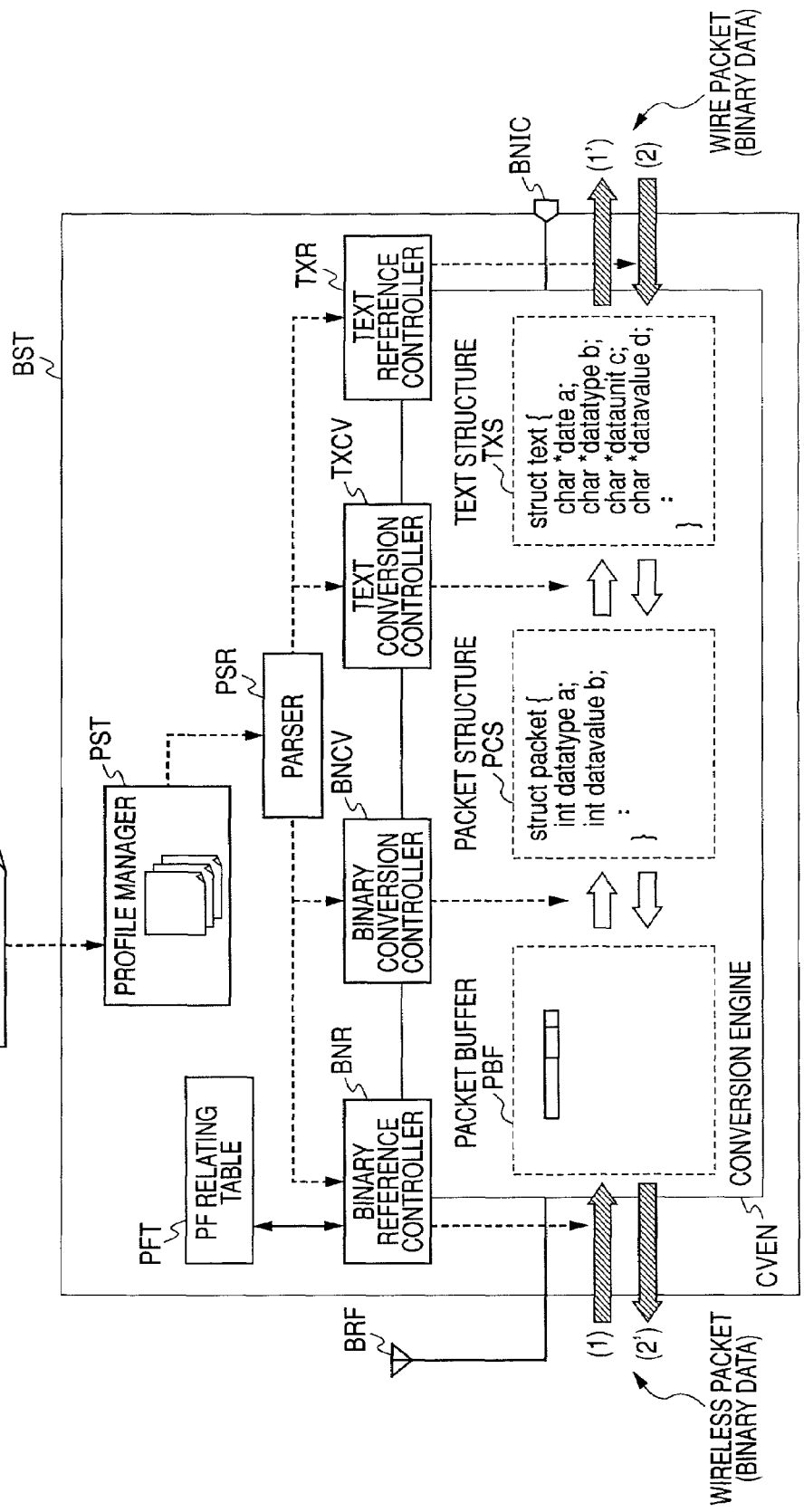
FIG. 2 is a block diagram showing a facility of a base station in the first embodiment.

FIG. 2 is a block diagram showing the details of the conversion engine CVEN of the base station BST. The conversion engine CVEN has a binary reference controller BNR that analyzes the contents of a packet including binary measured data (or a request for connection) when the radiocommunication controller BRF receives the packet and settles referential relation with a profile PF to be applied, a binary conversion controller BNCV that performs mutual conversion between the received binary measured data and an internal format (packet structure PCS) of the conversion engine CVEN, a text conversion controller TXCV that performs mutual conversion between the internal format (the packet structure PCS) and a message (measured data in the text format) on the side of the wired network WDN, a text reference controller TXR that analyzes the contents of a packet including a command when the wire communication controller BNIC receives a message in the text format and settles referential relation with a profile PF to be applied, a packet buffer PBF that temporarily stores the received packet and a profile relating table (a conversion definition information relating table) PFT1 storing relation between the ID of the sensor node or of the packet and a profile PF for converting an up packet.

Further, the conversion engine CVEN converts local ID in the wireless network WLN of measured data from the sensor node SN1 to SNn to global ID used in the wired network WDN or converts global ID to local ID.

The local ID means ID in a scope of one personal area network (PAN) for example. Normally, one base station BST having a function for managing local IDs exists in one PAN. The local ID has shorter bit length than that of the global ID and when the local ID is included in a send/receive packet, its effect of inhibiting the power consumption of radiocommunication can be expected.

The global ID means ID based upon which at least an application program of the sensor network system or a host system of the sensor network system can identify the sensor node. As one sensor network system can include plural PANs, the application program or the host system of the sensor network system manages the sensor node using the global ID.

Therefore, the global ID includes more bits, compared with the local ID. For example, ucode of a ubiquitous ID center basically includes 128 bits and a global electronic product code (EPC) includes 96 bits. In the meantime, the local ID includes approximately 16 bits for example.

<Sensor Network Server>

The sensor network server SNS converts measured data in the text format (raw data of the sensors) collected from the plural base stations BST1 to BSTn via the wired network WDN (for example, the Internet) to values which a person can understand and stores them in the database DB. The sensor network server SNS provides measured data to which the semantic information is added to a user terminal (a user computer) UST via its database DB.

The sensor network server SNS includes a wire communication controller SNIC that communicates with the base station BST, a wired sensor, an RF tag reader, a mobile telephone and a user terminal UST via the wired network WDN, an interface for the base station BIF that communicates with the base station BST, an interface for an application program AIF and an interface for management MIF that communicate with the application program APP of the user terminal UST and with a management tool, a profile manager PMG that stores profiles PF preset by an administrator and others and distributes them to the base station BST, a sensor network manager NMG that manages each configuration of the base station BST and the sensor nodes SN1 to SNn, an event publisher EVP that requests a converter DCV to convert an output value from the sensor SS written to measured data to a significant measured value according to the classification of the data when the measured data in the text format is received from the base station BST, the converter DCV that selects a suitable conversion rule (measured value conversion plug-in) according to the request from the event publisher EVP, adds semantic information such as a unit to the measured data and converts the measured data to a value which a person can understand and a database controller DBMS that stores and manages the measured data to which the semantic information is added in the database DB.

The interface for management MIF provides functions for the administrator utilizing the user terminal UST to perform various system managements including profile management (creation, a change and distribution). The interface for the application program AIF provides measured data and others provided by the sensor network system as service for the application program operated in the user terminal UST. The interface for the base station BIF provides functions for receiving measured data from the base station BST, for transmitting a command related to the setting of the sensor nodes SN1 to SNn and for distributing a profile PF.

The sensor network manager NMG provides functions for controlling the operation such as the setting of an interval of transmission of each sensor node SN1 to SNn and for managing measured data. The profile manager PMG provides functions for registering a profile PF and for distributing and managing the profile PF to the base station BST. Profiles PF are stored in a profile registry database PDB shown in FIG. 3. A group of profiles of the whole sensor network system are stored in the profile registry database PDB. The profile manager PMG distributes a function and a parameter written to a profile PF to the sensor network manager NMG.

Figure 3:
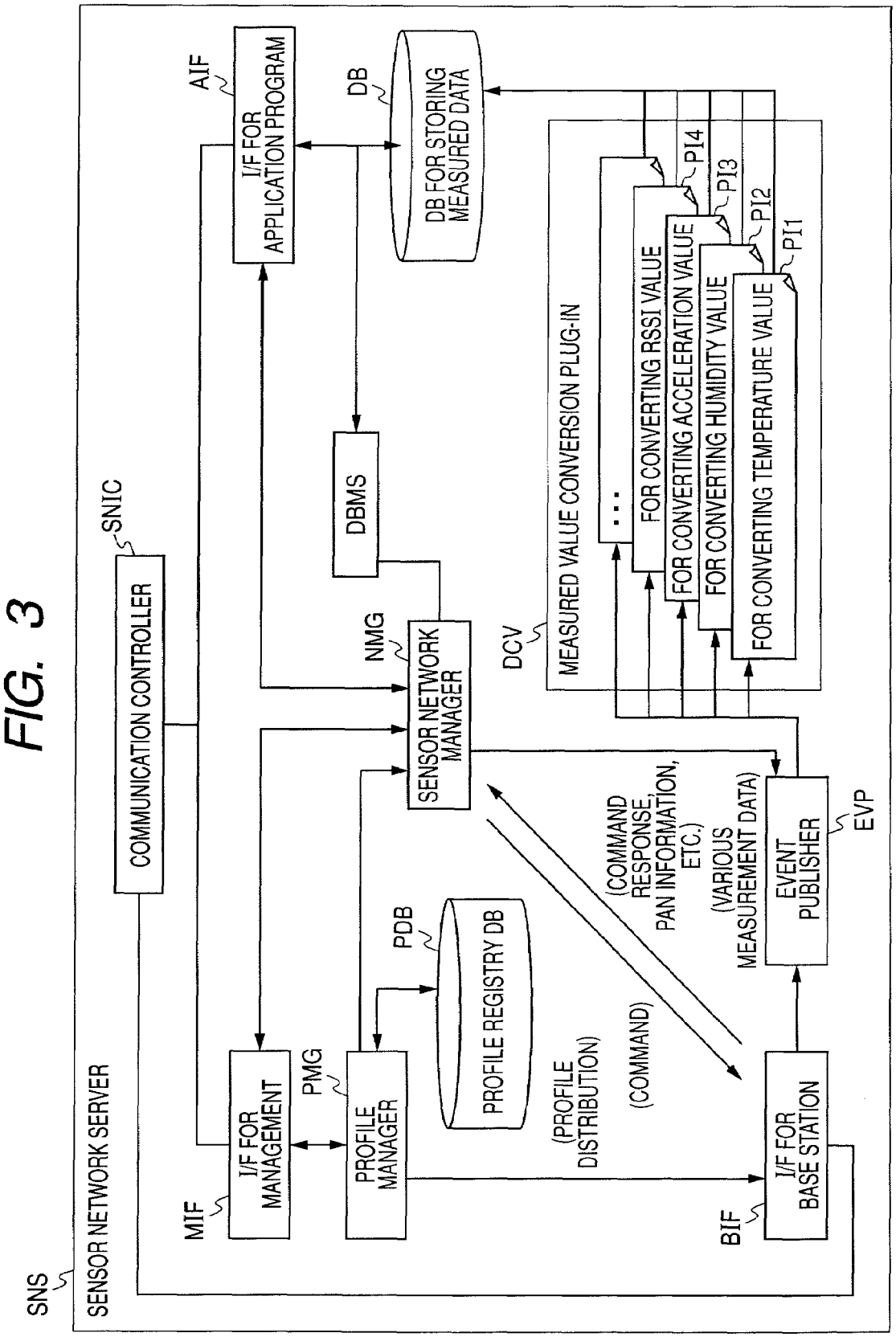
FIG. 3 is a block diagram showing a facility of a sensor network server in the first embodiment.

The converter DCV has measured value conversion plug-in (measured value conversion definition information: second conversion definition information) according to the classification of measured data of the sensor nodes SN1 to SNn that belong to the sensor network system as shown in FIG. 3.

To measured data to which the classification of data is added in the base station BST and the data format of which is converted to the text format, the output value from the sensor SS is written as a value measured by the sensor node as it is. The measured value conversion plug-in configuring the converter DCV converts the output value to a value which a person can understand, further, adds a unit such as SI as semantic information, and converts to significant measured data.

At this time, the event publisher EVP inquires the sensor network manager NMG of the classification of the sensor node SN1 to SNn based upon ID (an MAC address) of the sensor node SN1 to SNn written to the measured data and selects the measured value conversion plug-in to be used. The event publisher instructs the converter DCV to convert the output value from the sensor SS to a significant measured value and to add a unit preset in the measured value conversion plug-in.

For the measured value conversion plug-in, plug-in for converting a temperature value PI1, plug-in for converting a humidity value PI2, plug-in for converting an acceleration value PI3 and plug-in for converting a received signal strength indicator (RSSI) value PI4 respectively shown in FIG. 3 can be given.

For example, the plug-in for converting a temperature value PI1 converts a value of measured data received from the base station BST to a value according to a unit such as "degrees C" and "degrees F". For example, when the contents of measured data received from the base station BST are <Temperature>

<Value>14936</Value>, specific plug-in for converting a temperature value PI1 is called based upon an identifier (for example, ID of the sensor node, or an MAC address) of the measured data, raw data of the sensor is converted to a value which a person can understand, and a unit is added. For example, an output value from the above-mentioned temperature sensor of '14936' is converted to significant information to which the meaning of "20 degrees C" is added by converting the output value in the plug-in for converting a temperature value PI1.

When the classification of the sensor nodes represents the classification of the sensors installed on it or of encoding formats of its measured data, the plug-in for converting a temperature value PI1 of the converter DCV is prepared with respect to each classification of the sensor nodes in the sensor network system and the plug-in PI1 according to ID of the sensor nodes SN1 to SNn is utilized. That is, as a characteristic of the sensors is different with respect to each classification of the sensor nodes SN1 to SNn, the plug-in PI is set beforehand with respect to each classification of the sensor nodes SN1 to SNn which the sensor network system utilizes.

The converter DCV extracts ID of the sensor node SN1 to SNn, determines preset ID of the sensor node and plug-in to be used, and converts a value of measured data.

The plural plug-ins for converting a humidity value PI2, the plural plug-ins for converting an acceleration value PI3 or the plural plug-ins for converting an RSSI value PI4 are also prepared with respect to each classification of the sensor nodes SN1 to SNn as the above-mentioned plug-ins for converting a temperature value PI1. The converter DCV calls the plug-in according to ID written to the received measured data of the sensor node and converts a value of the measured data to significant information.

The measured data converted to the significant information by the converter DCV is stored in the database DB via the DB controller DBMS.

The measured value conversion plug-in can be set at any time when needed with respect to each classification of measured data. And when measured data (the sensor node) of new classification is handled, new measured value conversion plug-in has only to be added from a management tool of the user terminal UST and others.

According to the configuration in this application, the sensor network server SNS can store measured data beforehand converted to the handy text format by the base station BST in the database DB after the meaning such as SI is further added to the measured data. When this application is not applied, data transmitted from the sensor nodes SN1 to SNn are stored in the database DB in an unchanged format. This data is binary data the meaning of which is tacitly determined by a specification of a sensor device, a microcomputer and radio-communication and it is very difficult for a person to understand the meaning. In addition, when data after it is stored in the database DB is provided to various application programs, the data is provided in a data format depending upon the above-mentioned specific specification and after the details of the specific specification are understood for an individual application program to utilize the data, the data is required to be converted to a convenient data format for itself again. In such a system, even if useful measured data is input, a degree of the reclamation of the data is low, an application program is forced to execute intricate data conversion, and the serviceability is greatly deteriorated. The effect of enhancing the degree of the reclamation of the collected measured data and enabling versatile data exchange is acquired by applying this application.

As described later, a data format is not necessarily required to be converted in the base station BST and the meaning of the data is not necessarily required to be added in the sensor network server SNS. To acquire the effect of this application, format conversion and the addition of the meaning have only to be executed in any location until data is stored in the database DB. In this embodiment, viewpoints of the distribution of a load of processing and the partial charge of a role based upon a processing level are added and an example considered particularly optimum is described.

<Packet Conversion Process by Base Station>
<Up Packet Conversion Process>

Referring to FIG. 2, a measured data conversion process executed by the base station BST will be described below. First, an up packet transmitted from the sensor node SN1 to SNn to the sensor network server SNS via the base station BST will be described.

The binary reference controller BNR refers to the profile relating table PFT1 based upon ID of the up packet (measured data) received from the sensor node SN1 to SNn or the sensor node SN1 to SNn, determines a profile PF to be applied as described later, and notifies the parser PSR of it. For the ID of the packet or the sensor node SN, an MAC address of the sensor node SN can be used for example. Or local ID (for example, an IP address) which the base station BST gives to the sensor node SN1 to SNn when the sensor node SN1 to SNn joins the base station BST may be also used.

The parser PSR reads the determined profile PF from the profile storage PST and notifies the text conversion controller TXCV of profile description for decoding described in the profile PF.

The binary conversion controller BNCV converts the received binary measured data to packet structure which is an intermediate code in the conversion engine CVEN.

The text conversion controller TXCV converts the contents of the packet structure to measured data in the text format to which semantic information is added based upon the profile description acquired from the parser PSR. The conversion engine CVEN sends the measured data in the text format to the wire communication controller BNIC and transmits it to the sensor network server SNS.

Figure 4:
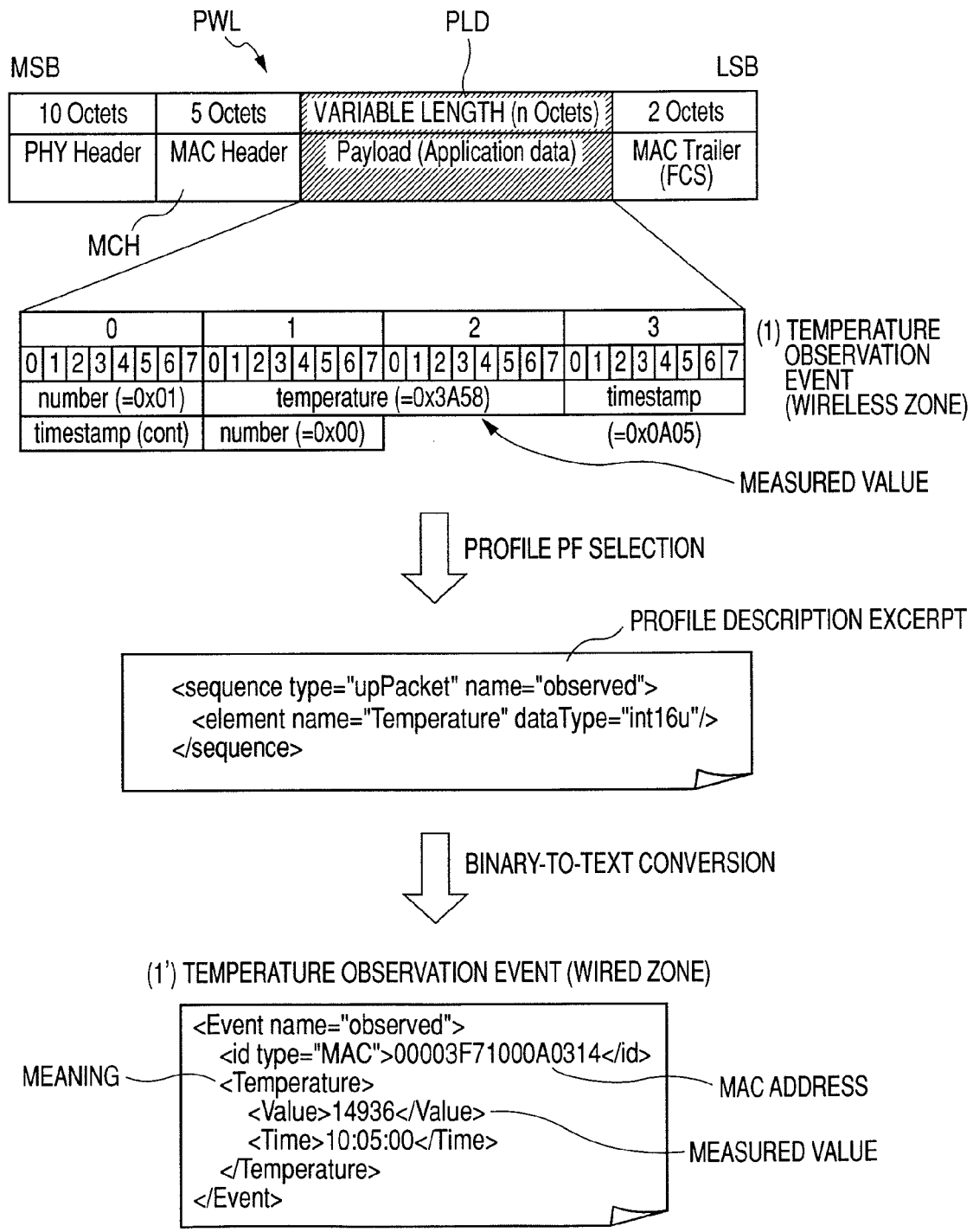
FIG. 4 is an explanatory drawing showing upward format conversion executed in the base station and showing one example of a data format converted from binary measured data of a wireless network to measured data in a text format applying a profile in the first embodiment.

FIG. 4 is an explanatory drawing showing one example that measured data from the wireless network WLN (a wireless zone) is converted to measured data in the text format in XML and shows a case that the sensor node has a temperature sensor.

As shown in FIG. 4, the measured data in the wireless zone is transmitted from the sensor node SN1 to SNn as a packet PWL and the base station BST receives it. In the packet PWL, a physical (PHY) header and an MAC header continue from the head (MSB in FIG. 4) and a payload PLD for storing data following the MAC header is set. In the MAC header, an MAC address which is an identifier of the sensor node SN1 to SNn as a sender is stored. Next to the MAC header, the payload PLD for storing data is set in variable length.

The binary reference controller BNR of the base station BST extracts the MAC address from the MAC header of the packet PWL when the binary reference controller receives measured data from the sensor node SN1 to SNn. Next, the binary reference controller BNR determines selecting sorting of a profile of the received packet PWL referring to the profile relating table PFT1 shown in FIG. 5. In the profile relating table PFT1, an entry is generated with respect to each sensor node SN1 to SNn in the initial connection of the sensor nodes SN1 to SNn and the selecting sorting is determined as described later.

The profile relating table PFT1 shown in FIG. 5, one entry of which corresponds to an MAC address, includes fields of the selecting sorting of a profile, ID of a profile to be selected and short ID acquired by reducing the profile ID.

The binary reference controller BNR designates a profile PF according to the selecting sorting of the corresponding MAC address in the profile relating table PFT and notifies the parser PSR of it.

For example, as shown in FIG. 4, in the case of measured data having the MAC address of 3F71000A0314, 0x02 in the field of the selecting sorting in the profile relating table PFT1 shown in FIG. 5 is acquired. In the selecting sorting, the profile ID of 0x041 described in the profile relating table PFT1 is selected.

The parser PSR reads the profile PF having the ID of 0x041 from the profile storage PST and sends its profile description to the text conversion controller TXCV. The text conversion controller TXCV applies the profile description to the packet structure converted by the binary conversion controller BNCV and converts to measured data in the text format.

For example, as shown in FIG. 4, the read description of the profile PF having the profile ID of 0x041 shall include <sequence type="upPacket" name="observed"><element name="Temperature" dataType="int16u"/></sequence>. This profile description means that the name in an "uppacket" (up packet) is set to "observed" (an observed value), semantic information is "Temperature" and the data type of the measured data is "int16u" (a two-byte value to be handled as an unsigned decimal number).

The text conversion controller TXCV acquires 0x3A58 which is data equivalent to first and second bytes in the payload PLD based upon this profile description. The text conversion controller converts it to "14936" which is an unsigned decimal number.

As a temperature observation event of the wired network WDN as shown in (1') of FIG. 4, the text conversion controller TXCV generates measured data in the text format where an MAC address of the sensor node is set as an identifier of measured data, "Temperature" specified in the profile description is set as semantic information and the converted decimal number of "14936" is set as a measured value. The wire communication controller BNIC transmits the measured data in the text format to the sensor network server SNS.

According to the configuration in this application, the effect of enabling providing data in the text format which is very readable and which enables flexible processing respectively for a person and versatile application programs is acquired by executing format conversion until measured data is stored in the database of the server, premising that the measured data transmitted by the sensor node is binary data like that of the conventional type. As correspondence to plural binary data is enabled by the effect of the profile storage PST, the profile relating table PFT and the binary conversion controller BNCV, the various types of nodes can be supported at any time when needed. Besides, to inhibit the power consumption of a battery particularly in the sensor node utilizing radiocommunication and to realize the utilization for a long term, the time of communication is required to be inhibited to be extremely short. However, there is a problem that when processing on the side of the sensor node is increased and extra information is added for the purpose of improving the existing sensor network system, the power consumption increases by quantity in which operation and a data amount to be communicated increase, the life of the battery is reduced, and in addition, the utilization ratio of a finite wire communication band is deteriorated when one sensor node performs redundant communication in utilizing multiple sensor nodes. This application is effective particularly to handle these problems.

<Down Packet Conversion Process>

Next, a command in the text format from the sensor network server SNS to the sensor node SN1 to SNn is transmitted to the base station BST and is transmitted to the sensor node SN1 to SNn after the command is converted (encoded) to a binary command in the base station BST. The base station BST converts a down packet to the sensor node SN1 to SNn as follows.

The text reference controller TXR calls the parser PSR for the appropriate description in the preset profile PF based upon the contents of the down packet (the command) received from the sensor network server SNS via the wired network WDN.

The parser PSR reads the determined profile PF from the profile storage PST and notifies the binary conversion controller BNCV of profile description for encoding described in the profile PF.

The text conversion controller TXCV converts the received command in the text format to packet structure which is the intermediate code in the conversion engine CVEN.

The binary conversion controller BNCV converts the contents of the packet structure to binary command data in a specific format based upon the profile description acquired from the parser PSR. The conversion engine CVEN sends the binary command to the radiocommunication controller BRF and transmits it to the sensor node SN1 to SNn.

FIG. 6 is an explanatory drawing showing one example that the command in the text format described in XML from the sensor network server SNS (a wired zone) is converted to the binary command and shows a case that sleep period is set for the sensor node.

As shown in FIG. 6, the contents of the command received from the sensor network server SNS via the wired network WDN (the wired zone) by the base station BST is analyzed by the text reference controller TXR. In the example shown in FIG. 6, the meaning of the command is "write", ID (an MAC address) of the sensor node which is a destination of the command is '3F71000A0314', and the "SleepPeriod" as the written object is set to '300'.

The text reference controller TXR notifies the parser PSR that the meaning of the command is "write" and the written object is "SleepPeriod".

Figure 7:
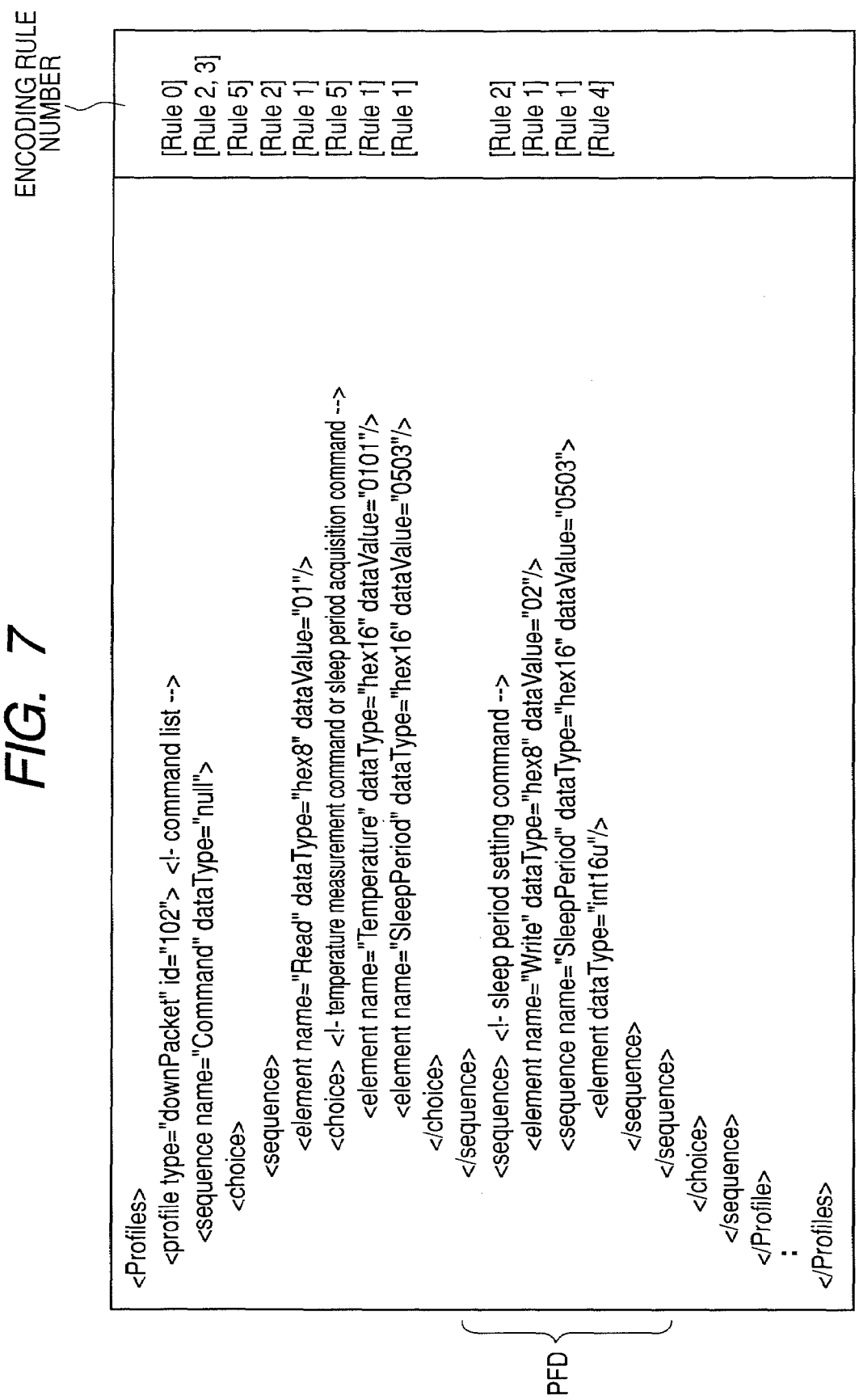
FIG. 7 is an explanatory drawing showing one example of a profile used in the downward format conversion executed in the base station in the first embodiment.

The parser PSR acquires a profile PF corresponding to the write command from the profile storage PST. FIG. 7 shows one example of the profile PF. The parser PSR acquires profile description (PFD in FIG. 7) corresponding to the write command as shown in FIG. 7 and notifies the binary conversion controller BNCV of it. FIG. 8 shows a sample of the commands in the text format to be converted and the corresponding commands in the binary format converted. The setting of the sleep period shown in FIG. 6 is equivalent to a sample No. 3 in the down packet format description shown in FIG. 8 and the format before and after conversion is described.

The binary conversion controller BNCV generates a packet PWL for the wireless network WLN (the wireless zone) including a hexadecimal number of '0x02' corresponding to the "write" command, a hexadecimal number of '0x0503' corresponding to the "SleepPeriod" and a hexadecimal number of '0x012C' corresponding to the set value of '300' (decimal number) based upon the profile description (PFD) shown in FIG. 7, sequentially sets the above-mentioned hexadecimal numbers in the payload PLD as shown in FIG. 6, and sets the binary command. The binary conversion controller sets the MAC address shown in FIG. 6 as a destination in the MAC header shown in FIG. 4. The radiocommunication controller BRF transmits the command in the binary format to the sensor node.

<Profile Description>

Next, the profile PF acquired from the profile storage PST by the parser PSR will be described.

The profile PF, which is defined in XML for example, has a decoding rule for converting binary measured data transmitted from the sensor node SN1 to SNn to the sensor network server SNS to measured data in the text format and an encoding rule for converting a command in the text format transmitted from the sensor network server SNS to the sensor node SN1 to SNn to a binary command. Each number and each contents of the decoding rule and the encoding rule will be described below.

(1) Decoding rule: (for response to command and event)

[Rule 0] When an attribute <type> of <Profile> or <sequence> is "upPacket", the decoding rule is applied.

[Rule 1] When <element> emerges, a tag of a name specified in <name> is generated, data specified in <dataType> is acquired from the payload PLD, and is stored in a text member.

[Rule 2] When <sequence> emerges, rules specified in a child member are sequentially applied.

[Rule 3] When <name> exists in an attribute of <sequence>, the tag of the specified name enclosing all child members is generated.

[Rule 4] When <maxOccurs> exists in the attribute of <sequence>, it is repeated that (a) a repeat number N is acquired from the payload and (b) the rules specified in the child member are sequentially applied by the acquired repeat number N.

[Rule 5] When <choice> emerges, (a) a serial number T (initiated from 0) of selection types is acquired from the payload and (b) the "T"th rule (initiated from 0) of the rules specified in the child member is applied.

[Rule 6] When <id> exists in an attribute of a child member of <choice>, definite correspondence (a hexadecimal value) to the selected number T in the payload is defined.

[Rule 7] When <dummy> emerges, a wireless payload is skipped by size specified in an attribute <dataType>.

[Rule 8] When <id> exists in an attribute of <Message>, a message format corresponding to a message identification number (a hexadecimal value) at the head of the payload is identified by the similar processing as that in <choice>.

[Rule 9] When <putparam> emerges, no data is read from the wireless payload and an external parameter defined in <type> is inserted in a format specified in <format>.

[Rule 10] In addition, a tacit decoding rule specified in a specific radiocommunication protocol may be also included.

(2) Encoding Rule: (for Command)

[Rule 0] When the attribute <type> of <Profile> or <sequence> is "downPacket", the encoding rule is applied.

[Rule 1] When <element> or <sequence> emerges, a tag of a name specified in <name> is acquired from a wired zone packet (in a text format), a value of <dataValue> is converted to a value in a format specified in <dataType>, and is stored in a payload of a wireless packet.

[Rule 2] When <sequence> emerges, rules specified in a child member are sequentially applied.

[Rule 3] When <dataType> of <element> or <sequence> is null, nothing is stored in the payload of the wireless packet.

[Rule 4] When <dataType> is except null in <element> or <sequence> and no <dataValue> exists, a value is acquired in a format specified in <dataType> from the wired zone packet, and is stored in the payload of the wireless packet.

[Rule 5] When <choice> emerges, any child member matched with the structure of the wired zone packet is selected and applied.

[Rule 6] When <getParam> emerges, a text element acquired from the wired zone packet is acquired in a format specified in <format> as an external parameter defined in <type>.

[Rule 7] In addition, a tacit encoding rule specified in a specific radiocommunication protocol may be also included.

As described above, the decoding rule for the up packet and the encoding rule for the down packet are described in XML and others.

FIG. 7 shows one example of profiles PF for encoding and FIGS. 9 to 11 show profiles PF for decoding. In FIGS. 9 to 11, the contents (semantic information) of the payload of the wireless zone, profile description, the decoding rule numbers and the text format are shown for individual samples Nos. 1 to 9. These profiles PF are stored in the profile storage PST. "dataType" used in the profiles PF shown in FIGS. 9 to 11 is preset as shown in FIG. 12.

For the profiles PF for decoding, the profile for converting one measured data included in the payload PLD to measured data in the text format as in the sample No. 1 and the profiles PF for converting plural measured data included in the payload PLD to plural measured data in the text format as in the samples Nos. 2 to 9 are defined.

The conversion engine CVEN can support various sensor nodes SN1 to SNn by selecting the profile PF according to the sensor node SN1 to SNn or the packet PWL. To join a new type of sensor node under the base station BST, a profile PF generated as described later is transmitted to the base station BST. The arbitrary sensor node SN1 to SNn can be utilized in the sensor network system by relating ID of the new sensor node and the new profile PF in the profile relating table PFT shown in FIG. 5.

In the samples Nos. 4 and 5 in FIG. 9, a case that the sensor node stores data measured by the sensor SS in the memory RAM and the stored measured data are collectively transmitted to the base station in transmission to the base station BST (batch communication) is described.

When the sensor node SN1 to SNn cannot communicate with the base station BST and a condition of radiocommunication is unstable, the sensor nodes SN1 to SNn try to transmit measured data to the base station BST with respect to each specific sleep period, however, when they cannot be connected to the base station BST and retrials of transmission are repeated, the battery BAT is just wasted. That is, the sensor nodes SN1 to SNn wait for a response (an ACK signal) from the base station BST after transmitting measured data, however, when no response is received after specific time elapses, operation (retrials) that the sensor nodes SN1 to SNn transmit measured data again and wait for a response is/are repeated.

Then, to prevent the battery BAT from being vainly wasted, the sensor nodes SN1 to SNn stop transmission to the base station BST when they cannot communicate with the base station BST after retrials of specific times (twice or three times) and store measured data in the memory RAM.

When the sensor nodes SN1 to SNn can communicate with the base station BST after next activation, they collectively transmit the stored past measured values in addition to the current measured values (the latest measured values).

In this case, according to the profile PF selected in the base station BST, plural measured values are extracted from measured data received from the sensor nodes SN1 to SNn and are converted to measured data in the text format in specific order (for example, in the order of time stamps).

The sensor network server SNS extracts the plural measured values when it receives the measured data including the plural measured values, adds a unit to the plural measured values, converts them, and stores them in the database DB in the specific order.

<Operation of Sensor Network System>

Next, the processing of the whole sensor network system will be described referring to FIG. 13.

FIG. 13 is a timing chart showing a flow of the processing executed among the sensor node SN1, the base station BST and the sensor network server SNS.

<When Connection of Sensor Node is Started>

The sensor node SN1 transmits a connection notification packet to join under the base station BST (T1). The base station BST is required to determine a profile PF to be applied to ID (for example, an MAC address) of the sensor node SN1. The base station BST that receives the connection notification packet from the sensor node SN1 analyzes the contents of the connection notification packet, generates a new entry in the profile relating table PFT shown in FIG. 5, and sets relation between the sensor node SN1 and the selected profile PF.

Figure 14:
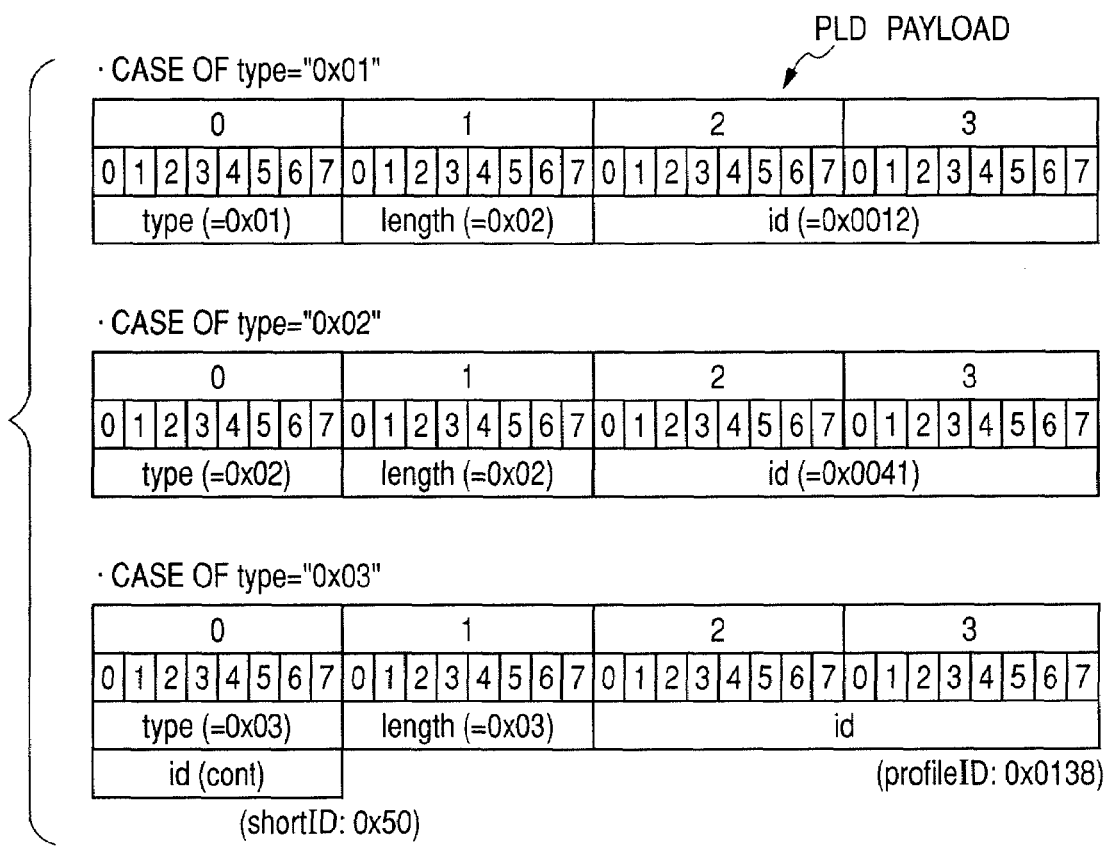
FIG. 14 is an explanatory drawing showing a data format in a payload of a connection notification packet in the first embodiment.

As shown in FIG. 14, a zeroth byte in a payload PLD of the connection notification packet transmitted by the sensor node SN1 is a type field showing selecting sorting for referring to profile ID and shows a value (selection information) in the selecting sorting of the profile relating table PFT shown in FIG. 5. A second byte and the following byte of the payload PLD are an ID field showing profile ID to be allocated to the sensor node SN1 or the packet and a first byte shows the size of the ID field.

When the base station BST receives the connection notification packet, the base station adds a new entry to the profile relating table PFT shown in FIG. 5 and adds an MAC address acquired from the MAC header of the packet PWL as ID of the sensor node SN1 in an MAC field of the profile relating table PFT shown in FIG. 5. The base station BST sets a type in the received payload PLD in the selecting sorting. As profile ID is allocated as ID of the sensor node SN1 when 0x02 is set in selecting sorting, a value acquired from the ID field of the payload PLD is set in a profile ID field of the profile relating table PFT.

Figure 16:
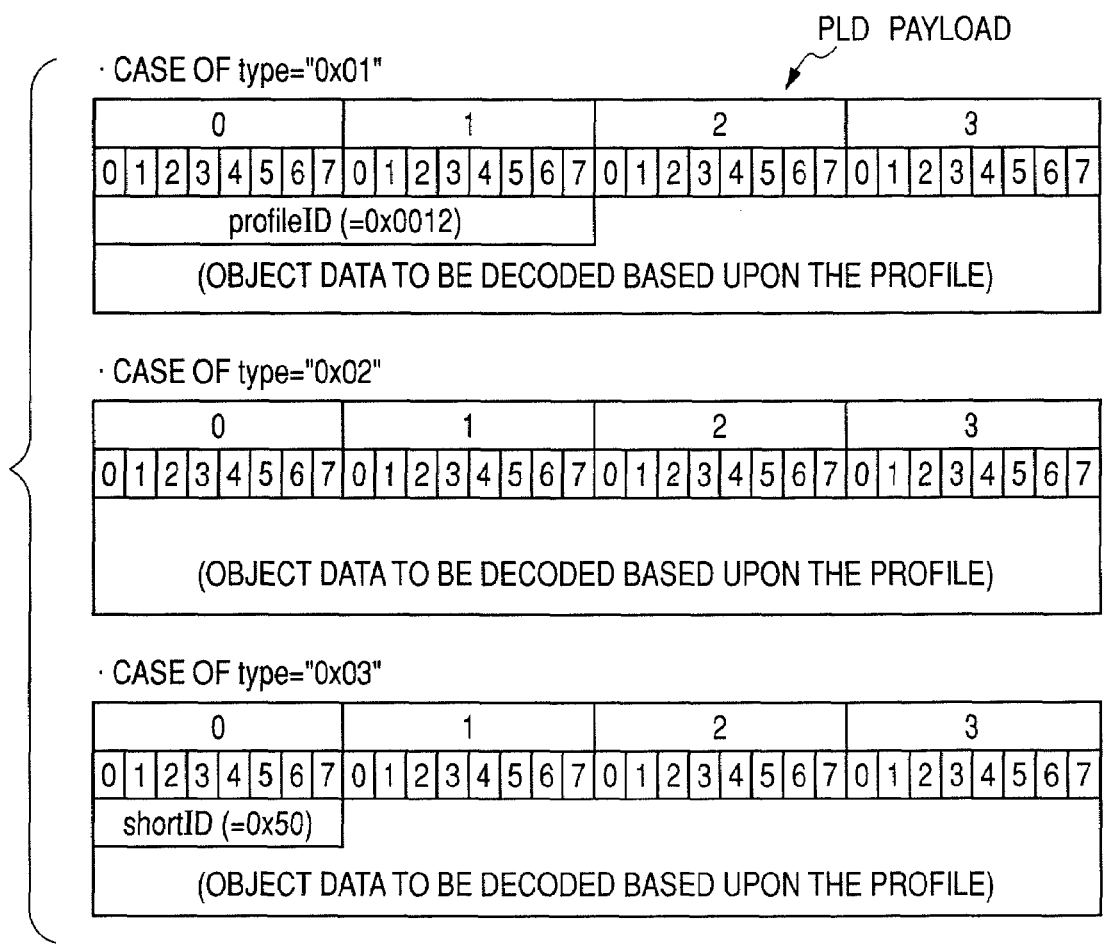
FIG. 16 is an explanatory drawing showing a data format of measured data corresponding to selecting sorting of a profile in the first embodiment.

FIG. 15 shows values of types showing selecting sorting of profile ID. When the type of the connection notification packet is 0x01, profile ID is specified at the head of the payload PLD with respect to each measured data. As in a case shown in FIG. 16 that the type is 0x01, the sensor node SN1 necessarily writes profile ID at the head of a payload PLD of an individual data packet when the sensor node transmits measured data. In this case, the profile ID is allocated to each packet PWL of the measured data. In this case, 0x01 is set in the selecting sorting of the profile relating table PFT and a value in an ID field of a connection notification packet is set as the profile ID.

In the sensor node SN1 as the type of which 0x01 is written to the selecting sorting, profile ID is specified not only in the connection notification packet but also in every data packets, so the sensor node SN1 can transmit plural kinds of data packets by using plural profile IDs. In this case, each data packet which is transmitted by the sensor node SN1 and includes different profile ID is decoded by the base station BST using different profile PF.

In a case that the type of a connection notification packet is 0x02, profile ID written to an ID field of the connection notification packet is allocated to an MAC address of the sensor node SN1.

By the connection notification packet, the sensor node SN1 notifies the base station BST of profile ID to be used. When measured data is transmitted, no profile ID is specified in an individual data packet as in a case shown in FIG. 16 that the type is 0x02, and the base station BST determines the profile ID corresponding to the MAC address. 0x02 is set in the selecting sorting of the profile relating table PFT in this case and a value stored in the ID field of the connection notification packet is set in a profile ID field. For example, in a payload PLD of the connection notification packet shown in FIG. 14 and having 0x02 in a type field, a profile PF having 0x0041 as its profile ID is allocated to the MAC address of the sensor node SN1.

A case that the type of a connection notification packet is 0x03 is similar to the case that the type is 0x01 in that profile ID is specified at the head of a payload PLD with respect to each measured data, however, in this case, short ID shorter than a profile ID value managed by the host system is used in measured data to compress data size in the wireless zone. In the example shown in FIG. 14 and having 0x03 in a type field, short ID of 0x50 is specified to indicate profile ID of 0x0138. When measured data is transmitted, the sensor node SN1 adds short ID to the head of the payload PLD to specify profile ID as in the case of type=0x03 shown in FIG. 16.

0x03 is set in the selecting sorting of the profile relating table PFT in this case, a value in an ID field is set as profile ID, and short ID is also set.

Also in this case, as in the case that 0x01 is set in the selecting sorting, the sensor node SN1 can transmit plural kinds of data packets by using plural short IDs. This can be achieved for the sensor node SN1 by transmitting connection notification packets plural times to update the correspondence between profile ID and short ID or to register a plurality of the correspondence.

In addition to the above-mentioned cases, There are a case (0x11) that profile ID is set as a type value according to the classification of the base station BST and a case (0x12) that profile ID is set as a type value according to the classification of a radiocommunication specification.

As described above, at T1 shown in FIG. 13, the base station BST sets the profile relating table PFT based upon a connection notification packet received from the sensor node SN1 and determines profile ID to be applied to the following measured data.

Besides, the base station BST notifies the sensor network server SNS of the MAC address of the sensor node SN1 which transmits a connection notification.

The sensor network server SNS records the MAC address of the sensor node SN1 that transmits the connection notification in the sensor network manager NMG and manages that the sensor node SN1 having the MAC address is under the base station BST.

Referring to FIG. 13, the case that the type of the connection notification packet is 0x01 will be described below. Suppose that the processing of the connection notification packet is completed at T1 and the profile ID of #1 is allocated to the MAC address. As shown in FIG. 13, a profile #1 (a node profile) includes plural packet profiles #A, #B and #C, in the sense of including either of their contents themselves or their reference structures. The base station BST notifies the sensor node SN1 of the completion of initial setting and permits the transmission of measured data. At this time, the base station BST allocates a local ID to the sensor node SN1.

Next, at T2 shown in FIG. 13, after specific sleep period elapses, the sensor node SN1 transmits measured data to the base station BST.

When the base station BST receives the measured data from the sensor node SN1, the base station BST identifies that the corresponding profile ID is #A based upon a value *A in an identification field at the head of a payload PLD. After the base station BST refers to the profile relating table PFT based upon the MAC address and identifies the node profile #1, it reads profile #A that is a subset of the profile #1, and converts the binary measured data including a measured value of temperature and a measured time to measured data in the text format. The base station BST transmits the measured data in the text format to the sensor network server SNS.

The sensor network server SNS extracts the MAC address and semantic information from the measured data received from the base station BST and selects measured value conversion plug-in to be applied. The selected measured value conversion plug-in converts a measured value (an output value of the sensor SS) written to the measured data in the text format to significant information to which a unit is added and stores it in the database DB.

"*A" has only to be identification information showing that the payload PLD corresponds to the definition of any of the plural packet profiles and is not necessarily required to be ID (#A) itself of the packet profile. When only one packet profile exists or packet definition is described in a node profile without using a packet profile, information in which correspondence to a part of the packet definition in the profile can be identified without contradiction can be arbitrarily set as identification information equivalent to "*A". When the node transmits only a fixed payload, such identification information itself is not required and the fixed payload can be interpreted by statically-described profile definition which is directly referred to by the profile relating table PFT shown in FIG. 5.

Next, in the case of down communication from the sensor network server SNS at T3 shown in FIG. 13, a corresponding node profile is identified from an MAC address value of a destination specified in a wired zone packet (in the text format). Further, it is identified from identification information in a message that a corresponding packet profile is #B. A binary command encoded according to the description of profile #B is transmitted to the wireless zone.

At T3 shown in FIG. 13, the sensor node SN1 receives and responds the command from the sensor network server SNS. In this response, the conversion to binary data is made according to the corresponding profile according to the similar procedure to that at T2.

As described above, in this embodiment, three roles are provided to the profile PF and two types of profiles PF different in the role are prepared. The first role of the profile PF is to enable referring to information defined in the profile PF at all times in communication with the specific sensor node SN1 to SNn by relating the profile to identification information stored in a connection notification packet transmitted by the sensor node SN1 to SNn. The profile PF that fulfills this role is called a node profile in this embodiment. The second role of the profile PF is to provide information required to encode or decode a packet such as measured data and a command transmitted/received after connection is established. The profile PF that fulfills this role is called a packet profile in this embodiment. Further, the third role of the profile PF is to specify a packet profile that provides a definition to encode or decode a packet transmitted/received by the specific sensor node. In this embodiment, this role is fulfilled by specifying the packet profile to be referred in the node profile.

Considering applicative serviceability, it is suitable that the sensor node SN1 to SNn is managed in units of its classification and its application. At that time, management based upon the classification of the sensor node SN1 to SNn can be very efficiently made by relating the sensor nodes SN1 to SNn that belong to the same classification to the same node profile utilizing the configuration described in this embodiment. When types of transmitted/received packets are different because mounted sensors SS are different though the body and the basic function of the sensor node SN1 to SNn are the same, very efficient management is enabled by newly preparing only a packet profile corresponding to a new packet type.

In this embodiment, the example that the two types of profiles PF of the node profile and the packet profile are prepared is described; however, the allocation of the roles of the profile PF is not limited to this example. For example, a single type of profile PF that fulfills both the first and the second roles can be also used. Or the first role and a function for controlling relating corresponding to this role are not provided at all and only the second role may be also provided by only the packet profile without using the node profile by necessarily storing identification information related to the packet profile in a payload PLD of a packet.

Figure 17:
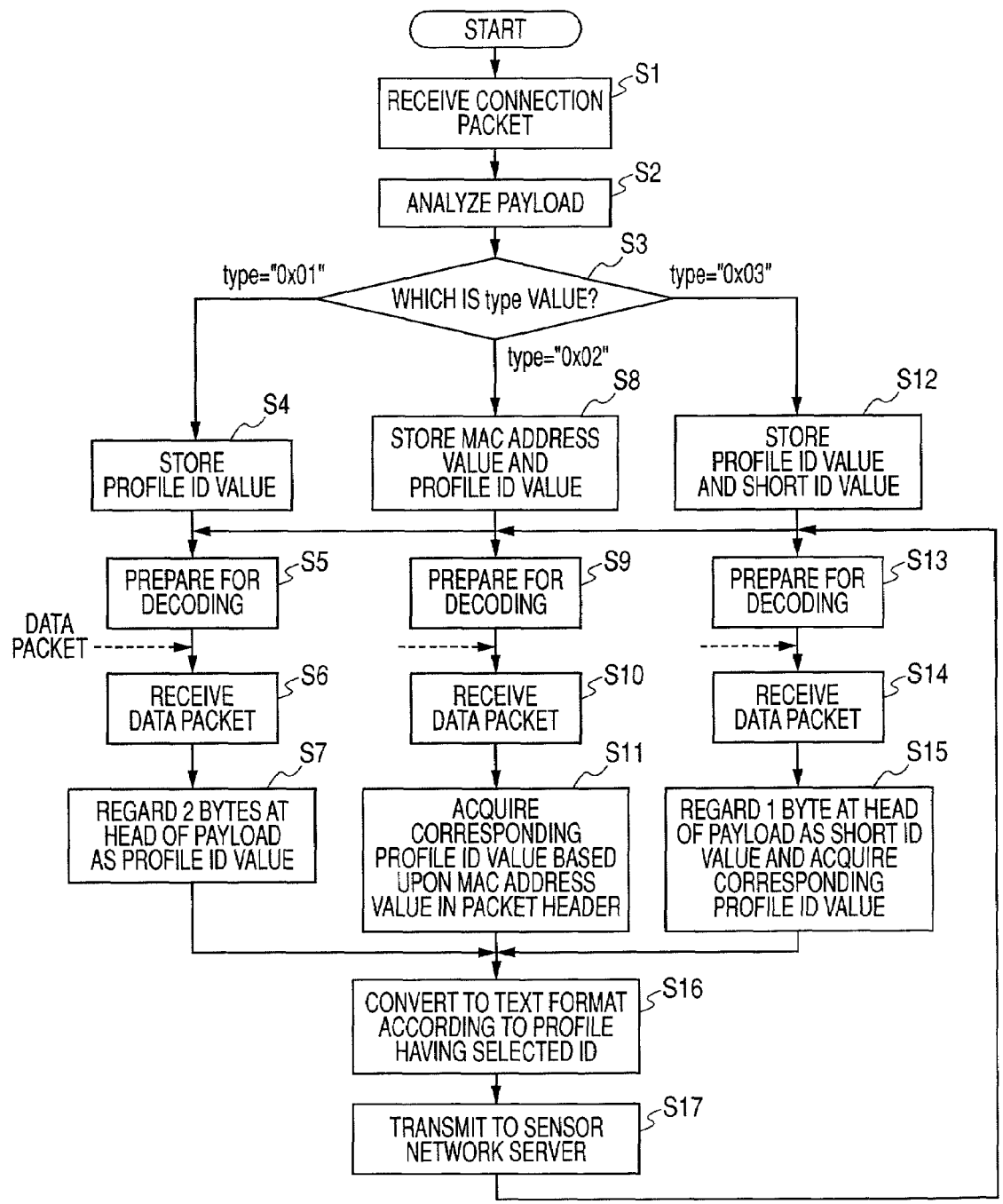
FIG. 17 is an explanatory drawing showing one example of processing executed in the base station in the first embodiment.

FIG. 17 shows a flowchart showing the processing of the base station BST.

The base station BST analyzes the contents of a payload PLD (S2) when it receives a connection notification packet (S1) The base station causes branches based upon a value in a type value field (S3). If a type value is 0x01, the process proceeds to S4, if a type value is 0x02, the process proceeds to S8, and if a type value is 0x03, the process proceeds to S12.

In S4, the base station records an MAC address, 0x01 as the type value and a value of profile ID in the profile relating table PFT. The base station waits for the reception of measured data (S5) and when the base station receives the measured data (S6), it extracts two bytes at the head from the payload PLD of the packet PWL as a value of the profile ID (S7).

The base station reads a profile PF corresponding to the extracted profile ID and converts the received binary measured data to measured data in the text format (S16). The base station BST transmits the converted measured data in the text format to the sensor network server SNS (S17). The process is restored to a process waiting for decoding (S5) and the base station waits for next measured data.

In a case that the type value is 0x02, the base station recodes an MAC address, the type value of 0x02 and a value of profile ID in the profile relating table PFT in S8. The base station waits for the reception of measured data (S9) and when the base station receives the measured data (S10), the base station refers to the profile relating table PFT based upon the MAC address of the packet PWL and determines profile ID (S11).

The base station reads a profile PF corresponding to the determined profile ID (S16), converts the received binary measured data to measured data in the text format as in a case that the type value is 0x01, and transmits it to the sensor network server SNS.

In a case that the type value is 0x03, the base station records an MAC address, the type value of 0x02 and values of profile ID and short ID in the profile relating table PFT in S12. The base station waits for the reception of measured data (S13) and when the base station receives the measured data (S14), the base station extracts a leading byte of a payload PLD of a packet PWL as short ID, refers to the profile relating table PFT based upon the MAC address, and determines profile ID corresponding to the short ID.

The base station reads a profile PF corresponding to the determined profile ID (S16), converts the received binary measured data to measured data in the text format as in the case that the type value is 0x01, and transmits it to the sensor network server SNS.

As described above, various sensor nodes SN1 to SNn can be utilized by applying the corresponding profile PF defined in the profile relating table PFT based upon an identifier such as the MAC address with respect to each sensor node SN1 to SNn though the base station BST is just one base station.

A new sensor node SN1 to SNn can be utilized only by updating a profile PF distributed to the base station BST, and the software of the base station BST and the software of the sensor network server SNS are not required to be updated as in the example of the related art. Besides, the measured data transmitted by the sensor node SN1 to SNn has only to include minimum data to specify profile ID. Therefore, the entry of a new type of sensor node and the adoption of a new protocol can be facilitated in the existing sensor network system, effectively utilizing the limited resources of radiocommunication. Particularly, in the case that the type value is 0x02, as profile ID can be determined by only the MAC address, no data for determining the profile ID is required to be added.

When plural base stations BST different in a function and performance mix, a profile PF used in each base station BST may be also differentiated. Further, in a case that terminals different in a radiocommunication specification itself such as a ZigBee terminal and an RF ID tag are integrally handled in one sensor network system, referential relation with a profile PF may be also controlled based upon the identification information of the base station BST and the radiocommunication specification (equivalent to a case that a type value is 0x11 and a case that a type value is 0x12 respectively shown in FIG. 15).

<Setting Profile>

Figure 18:
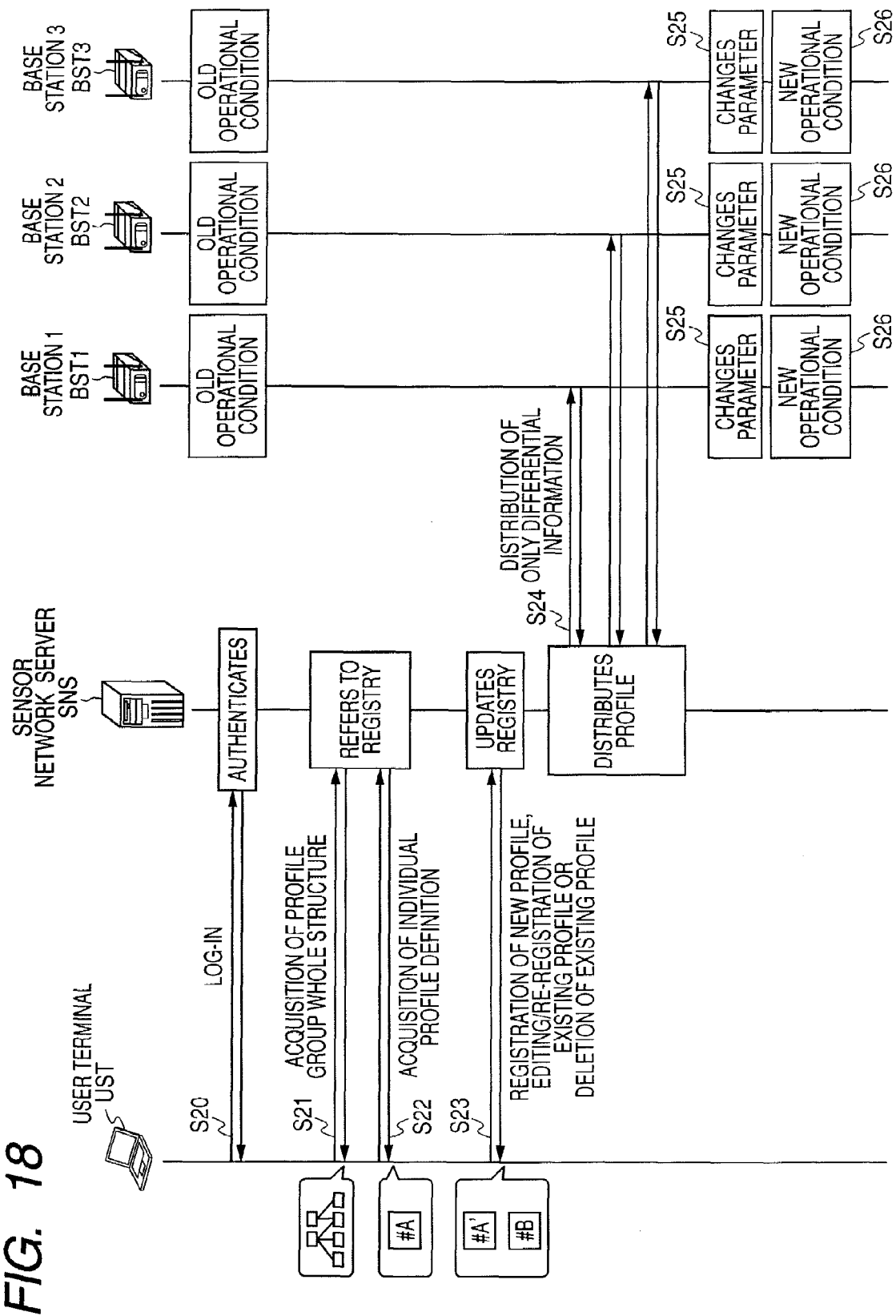
FIG. 18 is a time chart showing the setting and the distribution of a profile executed in the sensor node, the base station and the sensor network server in the first embodiment.

Referring to FIG. 18, the setting of a profile PF stored in the profile storage PST of the base station BST will be described below.

FIG. 18 shows an example that a profile PF is updated by the user terminal UST utilized by the administrator of the sensor network system and the sensor network system configured by the sensor network server SNS and three base stations BST1 to BST3.

First, the user terminal UST logs in the sensor network server SNS and completes authentication (S20).

Next, the user terminal UST requests the profile manager PMG of the sensor network server SNS to refer to the whole structure of a profile group stored in the profile registry database PDB (see FIG. 3) (S21). The sensor network server SNS transmits the whole structure of the profile group to the user terminal UST based upon the request.

In the user terminal UST, the administrator selects a desired profile and requests the sensor network server SNS of the details of the corresponding profile PF (S22). The sensor network server SNS reads the profile PF of #A specified according to the request from the profile registry database PDB and transmits it to the user terminal UST.

The user terminal UST changes the profile PF of #A and registers it in the profile registry database PDB of the sensor network server SNS as #A (S23). Besides, the user terminal UST generates a new profile PF of #B for a new sensor node and registers it in the profile registry database PDB. Besides, the user terminal UST instructs the sensor network server SNS to delete an unnecessary profile PF.

The sensor network server SNS applies the result of updating, adding or deleting a profile PF according to the instruction of the user terminal UST to the profile registry database PDB of the profile manager PMG.

When the profile registry database PDB is updated, the sensor network server SNS distributes the updated profile PF to the base stations BST1 to BST3 in the sensor network system (S24). At this time, the sensor network server SNS distributes only updated information in the profile PF in the profile registry database PDB to inhibit traffic.

In each base station BST1 to BST3, a parameter in the profile storage PST is updated based upon only the updated information of the profile PF received from the sensor network server SNS (S25) so as to update the profile PF, add or delete to/from the profile PF (S25).

When the update of the profile storage PST is completed, each base station BST1 to BST3 starts new operation (S26).

As described above, when the profile registry database PDB of the sensor network server SNS is updated according to a change of the classification of the sensor node and a change of specifications, the update of the profile PF can be automatically reflected in all the base stations BST1 to BST3 in the sensor network system.

Therefore, as the update of the profile PF in all the base stations BST1 to BST3 is realized with extremely small labor and the updated contents are immediately reflected in the base stations BST1 to BST3 after the profile registry database PDB of the sensor network server SNS is updated, the addition and the update of the sensor node can be promptly executed.

<Summary>

As described above, in the invention, the format conversion rule for converting measured data received from the wireless network WLN by the base station BST to measured data in a handier format can be set from the host server (the sensor network server SNS) as a profile PF. Hereby, a new type of sensor node and a new protocol can be easily adopted without updating software in the base station BST. Particularly, the management in handier data is enabled by the conversion from the binary format to the text format.

In the base station BST, a load of the wireless network WLN having many constraints on resources is reduced by transmitting the following information to the wired network WDN after adding semantic information to raw information received from the sensor node SN based upon the profile distributed from the sensor network server SNS, and the efficiency of utilization can be enhanced.

As semantic information is added to measured data stored in the sensor network server SNS in the gateway (the base station BST) according to the profile PF according to a type of the sensor node, the sensor network server SNS can easily process the measured data, and the development and the maintenance of an application program can be facilitated in the sensor network utilizing versatile sensor nodes.

Besides, as the measured value conversion plug-in converts measured data in the text format to which the output value of the sensor SS is written in the sensor network server SNS, measured value conversion plug-in has only to be added when a new type of sensor node is added and in the existing sensor network system, the entry of the new type of sensor node can be executed easily and at a low cost.

The example that the conversion engine CVEN that converts binary measured data to measured data in the text format and the parser PSR are provided to the base station BST is described above, however, the conversion engine CVEN and the parser PSR may be also provided to the sensor network server SNS. Or a computer having the conversion engine CVEN and the parser PSR may be also provided on a path of the wired network WDN from the base station BST to the sensor network server SNS.

Besides, the example that the converter DCV that converts data sensed by the sensor SS to significant information is provided to the sensor network server SNS is described above, however, the converter DCV may be also provided to the base station BST. In this case, as semantic information is added to measured data stored in the sensor network server SNS according to the profile PF according to the type of the sensor node in the gateway (the base station BST) and a measured value is converted by the plug-in, the sensor network server SNS is not required to process the measured data and can reduce a load.

Besides, in this embodiment, the example that the distribution of a profile and the database DB for storing measured data are configured in the same computer is described, however, a server that distributes a profile and a server that provides the database DB for storing measured data may be also configured by independent computers.

In addition, the example that the conversion engine CVEN that converts binary measured data to measured data in the text format using the profile PF is arranged in the base station BST and the converter DCV that converts the output value of the sensor SS to that with SI is arranged in the sensor network server SNS is described above, however, either of the sensor network server SNS or the base station BST may also have the conversion engine CVEN and the converter DCV. In this case, the profile has only to be handled as the first conversion definition information and the plug-in has only to be handled as second conversion definition information. That is, the plug-in can be also arbitrarily set according to the type of the sensor node SN1 to SNn and required processing.

TRANSFORMED EXAMPLE 1

Figure 19:
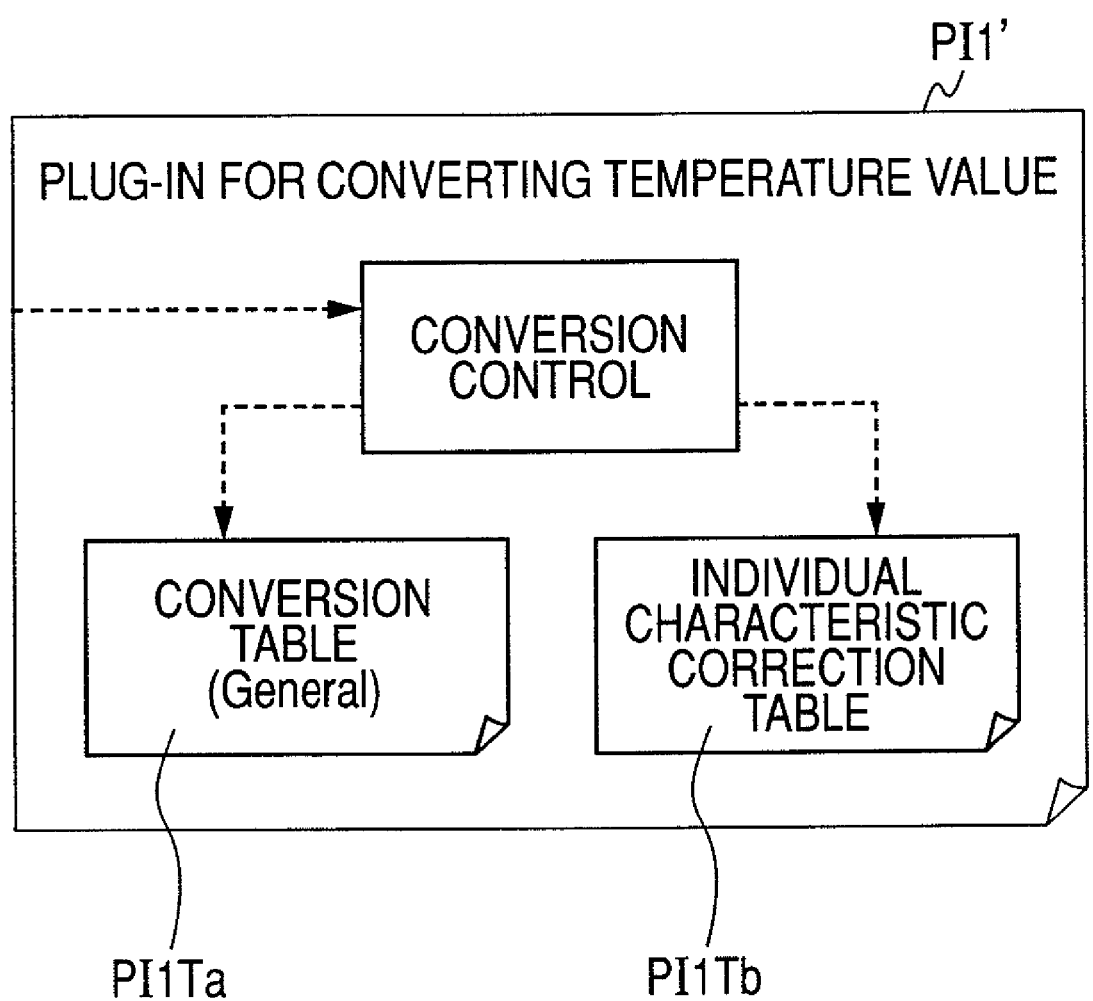
FIG. 19 is an explanatory drawing showing a transformed example 1 and showing the details of plug-in of the sensor network server.

As for the measured value conversion plug-in shown in FIG. 3, the example that the output value (a value converted to a decimal number) of the sensor SS is converted to significant information with SI is described, however, as shown in FIG. 19, a conversion table PI1Ta for converting the output value of the sensor SS such as the temperature value conversion plug-in PI1' and an individual characteristic correction table PI1Tb for compensating an error among the individual sensor nodes based upon the converted measured value may be also provided. Hereby, an error with respect to each individual sensor node is compensated and more precise measured data can be provided.

Second Embodiment

Figure 20:
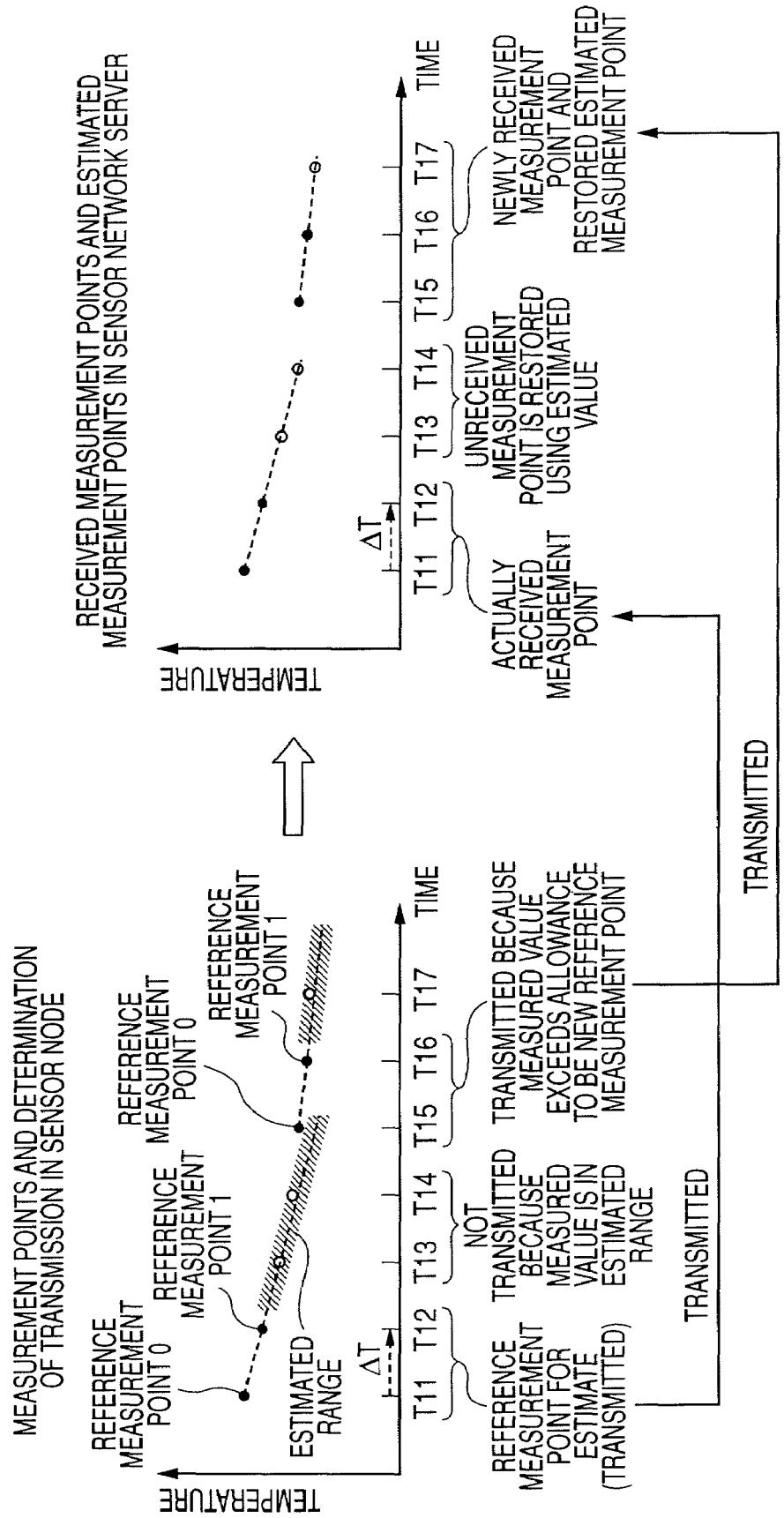
FIG. 20 shows a second embodiment and is a graph showing relation in data and time between a sensor node and a sensor network server in the case of constructive transfer.
Figure 21:
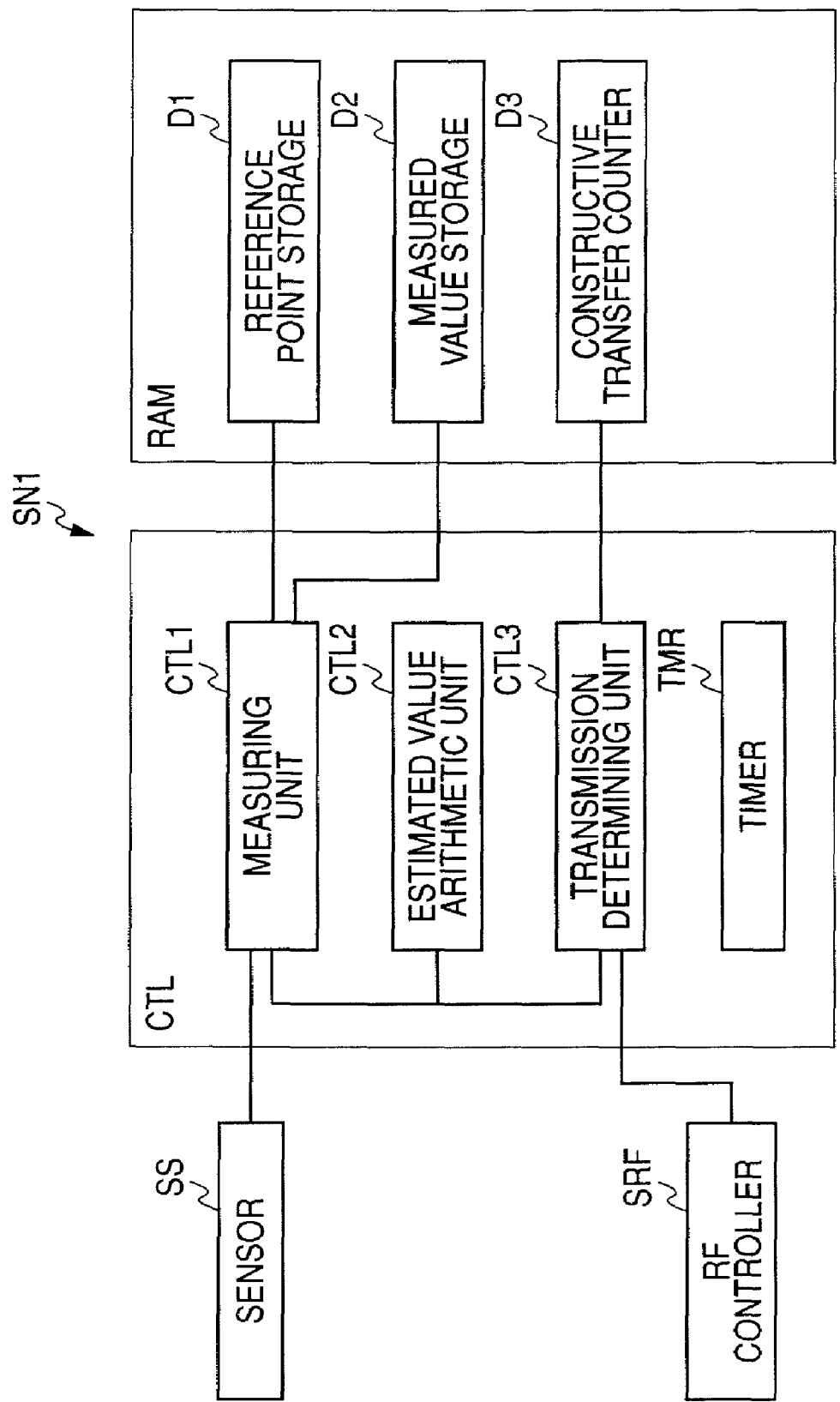
FIG. 21 similarly shows the second embodiment and is a block diagram showing functional elements of the sensor node.
Figure 22:
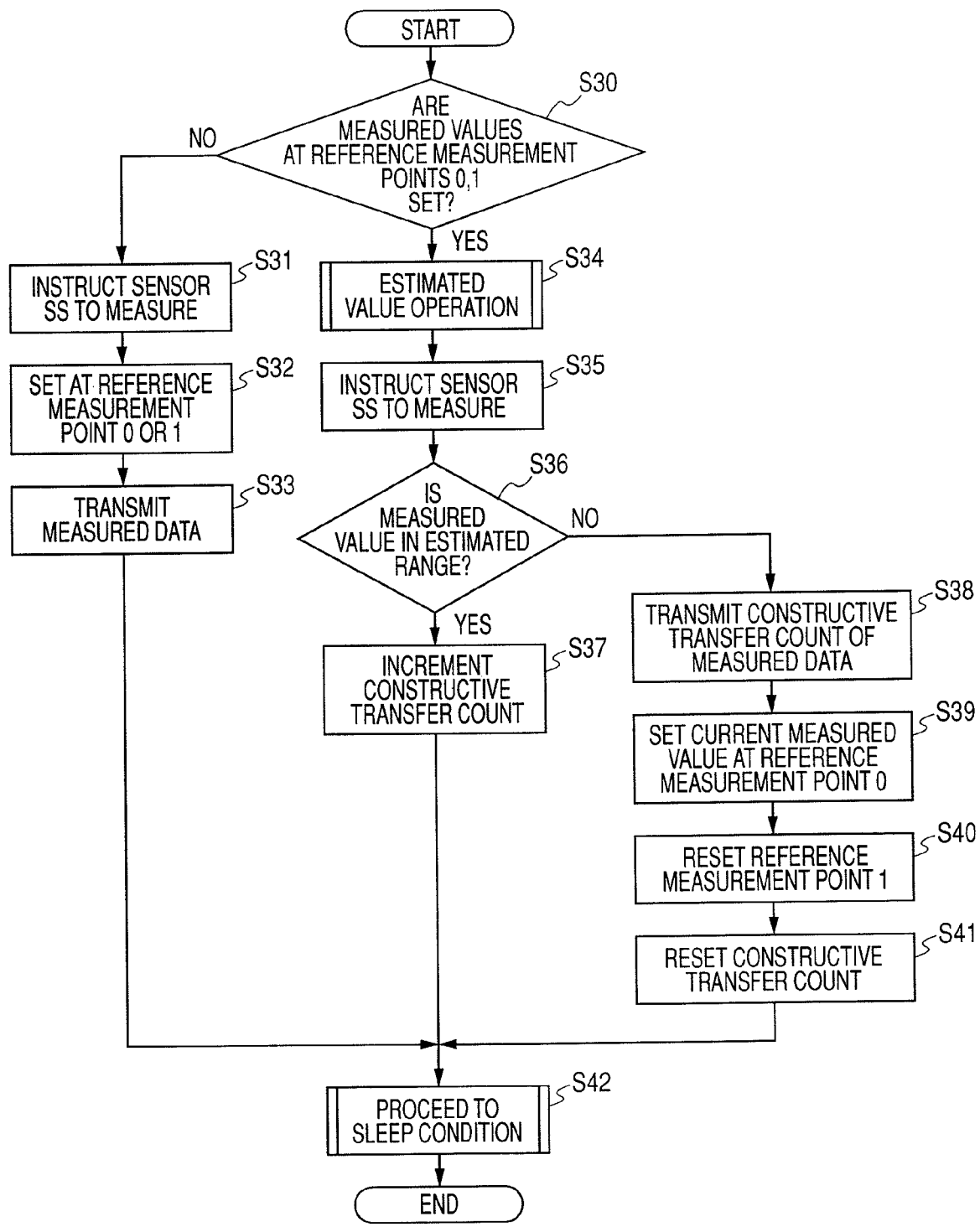
FIG. 22 similarly shows the second embodiment and is a flowchart showing one example of a process executed by a controller of the sensor node.

FIGS. 20 to 22 show a second embodiment. If an estimated value of a measured value acquired at this time and output from a sensor SS is within an allowable range (an allowable error) when a specific sleep period elapses, a sensor node SN1 to SNn does not transmit the result of measurement and a sensor network server SNS operates an estimated value using the same algorithm as the sensor node SN1 to SNn to be measured data. Hardware of a sensor network system is similar to that in the first embodiment and is different in a control program of the sensor node SN1 to SNn, a profile PF of a base station BST and plug-in of the sensor network server SNS.

The sensor node SN1 to SNn (hereinafter SN1) is required to be driven for a long time by a battery BAT and therefore, it is desirable that the frequency of radiocommunication requiring large power consumption is possibly reduced.

Particularly when the sensor SS is a temperature sensor and a humidity sensor, rapid variation does not frequently occur because a measured value depends upon environment. Then, the next estimated value is operated based upon a tendency of the variation of measured values and if the estimated value is within a preset allowable range based upon a measured value (an actually measured value) when the sleep period is finished, power consumption is greatly inhibited by omitting the transmission of a measured value. That is, power consumption required for radiocommunication is possibly reduced, compared with a case that a measured value is transmitted every time the sleep period is finished.

In the meantime, the sensor network server SNS generates measured data by the same estimating operation as the sensor node SN1 in place of an unreceived measured value and compensates a database DB. That is, the sensor node SN1 notifies the sensor network server SNS of the frequency of an untransmitted measured value when the sensor node SN1 newly transmits a measured value. The sensor network server SNS can precisely compensate actually uncommunicated measured data by operating an estimated value and generating measured data with respect to each sleep period based upon the time of the last received measured value because a sensor network manager NMG manages the sleep period of the sensor node SN1.

<Outline of Control>

FIG. 20 is graphs showing relation between a measured value and an estimated value in the sensor node SN1 in the second embodiment and relation between a measured value (a black circle in FIG. 20) and an estimated value (a white circle in FIG. 20) in the sensor network server SNS. In this example, a temperature sensor is used for the sensor SS.

As for the sensor node SN1 on the left side of the drawing, first, two reference measurement points 0, 1 are created. Therefore, a measured value (an actually measured value) measured at time T11 is stored as the reference measurement point 0 and a measured value measured at time T12 after the specific sleep period is stored as the reference measurement point 1. At each time T11, T12, the measured values are transmitted to the sensor network server SNS via the base station BST. In the database DB of the sensor network server SNS shown on the right side of FIG. 20, measured data acquired by converting the measured values (the actually measured values) at the time T11, T12 to significant information described in the first embodiment are stored.

Next, the sensor node SN1 operates an estimated value at time T13 based upon the values at the two reference measurement points 0, 1 as described later. The sensor node drives the sensor SS, acquires a measured value, does not transmit the measured value if the measured value is within an allowable range to which a specific range of the estimated value is added, and proceeds to a sleep condition. At this time, the sensor node stores a frequency by which transmission is omitted (hereinafter called a frequency of constructive transfer) before the sensor node proceeds to the sleep condition. The sensor node compares an estimated value and a measured value similarly at time T14, as the measured value is within the allowable range, does not transit it, increments a frequency of constructive transfer, and proceeds to the sleep condition.

At time T15, as a measured value exceeds the allowable range, the sensor node SN1 transmits the measured value and a frequency by which transmission is omitted since the last transmission till the present to the base station BST. Besides, the sensor node SN1 sets the measured value at the time T15 at the reference measurement point 0 because a reference measurement point at which an estimated value is operated varies, clears the data at the reference measurement point 1, and sets the next measured value. At the next time T16, the sensor node sets a measured data at the reference measurement point 1 and transmits the measured value to the base station BST. At the next time T17, as the two reference measurement points 0, 1 are set, the sensor node SN1 operates an estimated value. The sensor node acquires a measured value from the sensor SS and determines whether the measured value is within the allowable range or not. The sensor node SN1 transmits no measured value because the measured value is within the allowable range and proceeds to the sleep condition.

In the meantime, the sensor network server NS receives the measured value at the time T15 and a frequency of constructive transfer. In this example, the frequency of constructive transfer is twice, as the sleep period of the sensor node SN1 is known, the sensor node SN1 operates estimated values at time T13, T14 with respect to each sleep period based upon the last received time T12, and generates measured data at each time T13, T14. The sensor network server SNS stores the generated estimated values at the time T13, T14 and the received measured value at the time T15 in the database DB after converting them in a converter DCV.

A frequency of radiocommunication can be greatly reduced because the sensor node SN1 does not transmit a measured value if the measured value is within the allowable range and the sensor network server SNS regards as communicating with the sensor node SN1 and generates the omitted measured value by the same estimating operation as the sensor node SN1 as described above. Hereby, a maintenance interval of the exchange and the charge of batteries in the sensor node SN1 are greatly extended and the sensor node SN1 operable without maintenance for a long term can be provided. The above-mentioned mode in which actual measured data is not communicated between the sensor node SN1 and the sensor network server SNS if the variation of measured values is within an allowable range and an estimated value is substituted for a measured value in the sensor network server SNS is called constructive transfer.

Further, the sensor network server SNS and the base station BST can greatly reduce each load of processing because a frequency of communication with the sensor node SN1 is greatly reduced. In other words, even if more sensor nodes SN1 are joined in the sensor network system, the sensor network server SNS and the base station BST can be prevented from falling in an overload.

<Control Over Sensor Node>

FIG. 21 is a block diagram showing functional elements that perform constructive transfer of functional elements of the sensor node SN1. In a memory RAM, a reference point storage D1 that stores the reference measurement points 0, 1, a measured value storage D2 that stores a value measured by the sensor SS and a constructive transfer counter D3 that counts a frequency of constructive transfer are set. The measured value storage D2 is a finite area in which measured values of a specific frequency are stored and may be configured by a ring buffer for example.

A controller CTL includes a measuring unit CTL1 that drives the sensor SS every time the specific sleep period elapses, acquires a measured value and stores it in the measured value storage D1, an estimated value arithmetic unit CTL2 that operates a current estimated value as described later when the measuring unit CTL1 measures and a transmission determining unit CTL3 that omits the transmission of measured data and increments the constructive transfer counter D3 when the measured value is within an allowable range corresponding to the estimated value and in the meantime, instructs the sensor node to transmit the measured value and a frequency of constructive transfer from a radiocommunication controller SRF to the base station BST when the measured value exceeds the allowable range. The other configuration is similar to the other configuration shown in FIG. 1 in the first embodiment.

FIG. 22 is a flowchart showing one example of control over constructive transfer executed by the controller CTL. The process is executed with respect to each specific sleep period.

First in S20, it is determined whether measured values are set at the two reference measurement points 0, 1 or not. When no measured value is set at the two reference measurement points 0, 1, the process proceeds to S31, the sensor SS is driven, and a measured value is acquired. In S32, the measured value is stored at the reference measurement point 0 or 1. Next, in S33, the measured value is transmitted to the base station BST as measured data. Afterward, the sensor node proceeds to the sleep condition in S42.

When a timer TMR of the controller CTL counts the specific sleep period, the controller CTL proceeds to an activated condition from the sleep condition and determines again in S30. As no measured value is set at the reference measurement point 1 after the measured value is set at the reference measurement point 0, a measured value is similarly acquired in steps S31 to S33, is transmitted to the base station BST, and is set at the reference measurement point 1.

As the measured values are set at the two reference measurement points 0, 1 in S30, the process proceeds to S34 and an estimated value is operated. In S35, a measured value is acquired by the sensor SS as in S31. In S36, it is determined whether the current measured value is within an allowable range based upon the estimated value acquired in S34 or not. When the measured value is within the allowable range, no measured data is transmitted and after the process proceeds to S37 and a value of the constructive transfer counter is incremented, the process proceeds to S42 and proceeds to the sleep condition.

In the meantime, when the measured value exceeds the allowable range in determination in S36, the process proceeds to S38, and the current measured value and a value of the constructive transfer counter are transmitted to the base station BST. After the current measured value is set at the reference measurement point 0 in S39, the reference measurement point 1 is reset in S40. Further, after the constructive transfer counter is reset in S41, the process proceeds to S42 and proceeds to the sleep condition. That is, in S38 to S41, when the measured value exceeds the allowable range, the current measured value and the value of the constructive transfer counter are transmitted to the base station BST, the reference measurement points 0, 1 and the value of the constructive transfer counter are reset, and the current measured value is set at the reference measurement point 0. Therefore, the next measured value is set at the reference measurement point 1 in S31 to S33 and is transmitted to the base station BST.

The tendency of the variation of measured values at the two reference measurement points 0, 1 is estimated as shown in FIG. 20 by executing the above-mentioned process every time the sleep period elapses, in a period when the measured value is within the allowable range, no measured data is transmitted, and an estimated value generated in the sensor network server SNS is used for measured data in place of an actually measured value.

Figure 23:
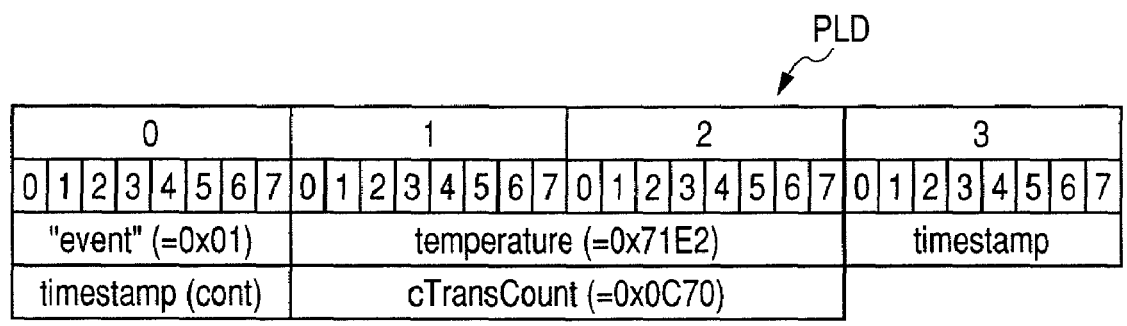
FIG. 23 similarly shows the second embodiment and shows a data format in a payload of a packet in a radiocommunication zone transmitted by the sensor node.

FIG. 23 shows a format of a payload PLD of measured data transmitted from the sensor node SN1 after the constructive transfer.

In FIG. 23, the 0th byte to the sixth byte are used, and a value denoting an event, a measured value (a temperature value output from the sensor in this example), a time stamp value and a frequency of constructive transfer (cTransCount in FIG. 23) are stored in the order from the head. In the step S33 in which measured data for the reference measurement points 0, 1 are transmitted, a frequency of constructive transfer is 0.

<Operation of Estimated Value>

The operation of an estimated value in S34 is as follows. An example that an estimated value xe is acquired by a linear expression will be described below:

$$xe = X_0 + \frac{X_1 - X_0}{T_1 - T_0} \cdot (t - T_0) \quad (1)$$

where, xe: Estimated value
X0: Measured value set at reference measurement point 0
T0: Time of reference measurement point 0
X1: Measured value set at reference measurement point 1
T1: Time of reference measurement point 1
t: Target time. The reference measurement point 0=(X0, T0) and the reference measurement point 1=(X1, T1).

When an allowable error range is d and a measured value at target time is x, it is determined whether the following expression is satisfied or not in S36:

$$|x - xe| < d \quad (2)$$

where, d: Allowable error.

If difference between a measured value x at target time t (for example, at the present time) and an absolute value of an estimated value xe is within a preset allowable error range as shown in the expression (2), the sensor node SN1 transmits no measured data. In the meantime, when the difference between the measured value x at the target time t and the absolute value of the estimated value xe exceeds the preset allowable error range, the sensor node SN1 transmits measured data.

The sensor network server SNS operates the estimated value according to the expression (1).

The example that the estimated value xe is acquired according to the linear expression is described above, however, to more enhance the precision of the estimate, a quadratic and a higher-order estimating expression may be also used.

<Processing by Base Station>

The base station BST analyzes measured data received from the sensor node SN1 as in the first embodiment and calls a profile PF corresponding to an MAC address of the sensor node SN1.

Figure 24:
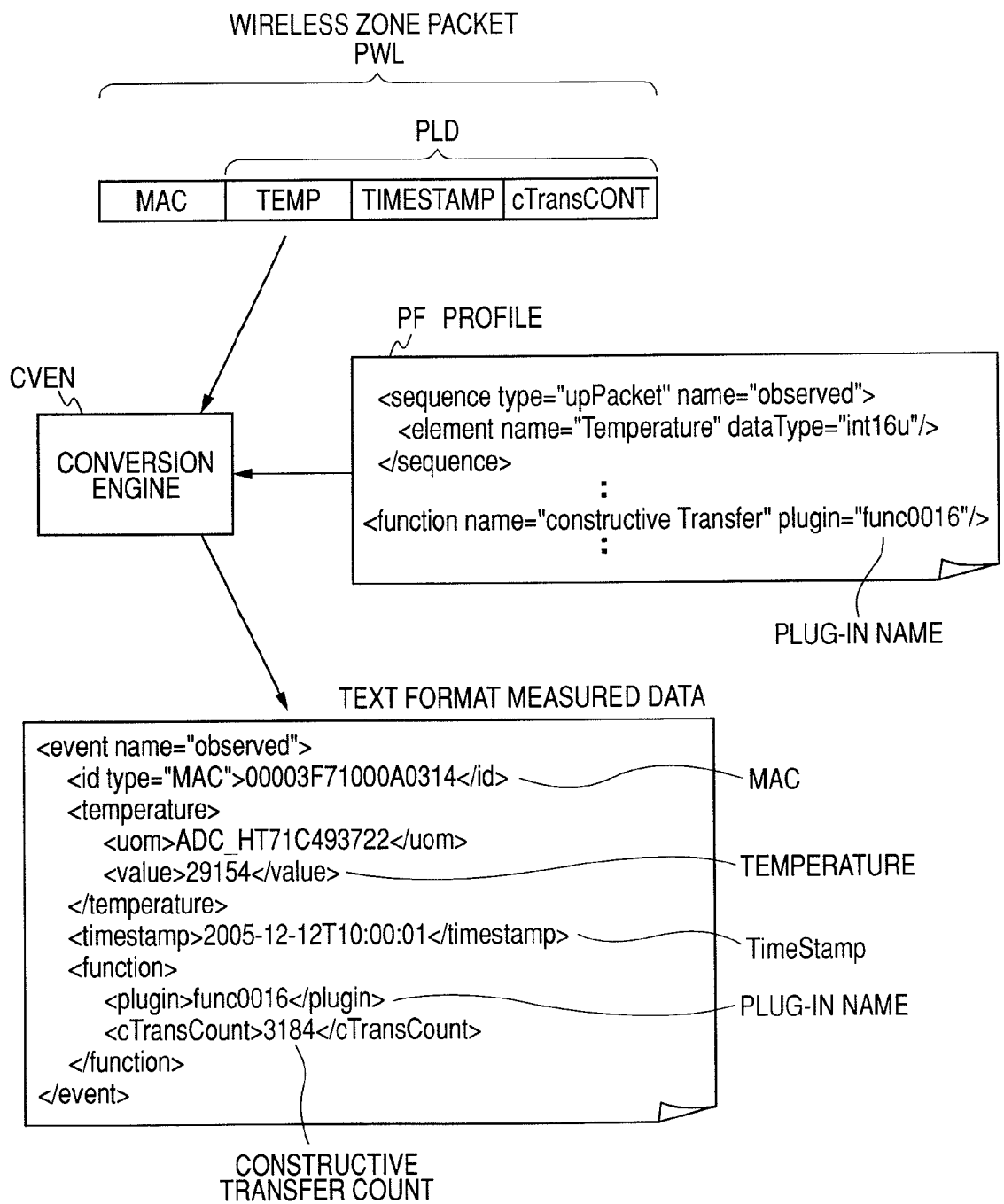
FIG. 24 similarly shows the second embodiment and is an explanatory drawing for explaining a format conversion process executed in a base station.

As shown in FIG. 24, a specific profile PF is called from a packet PWL received by the base station BST via a radiocommunication zone by a conversion engine CVEN as in the first embodiment. In this case, a plug-in name (func0016 in FIG. 24) called by an event publisher EVP of the sensor network server SNS is written to the profile PF for constructive transfer in the measured data in a text format.

The conversion engine CVEN converts temperature in the binary measured data received from the sensor node SN1 to a decimal number based upon the profile PF and generates measured data in the text format to which a time stamp, the plug-in name and a frequency of constructive transfer are written. The base station BST transmits the measured data in the text format including the plug-in name and the frequency of constructive transfer to the sensor network server SNS.

<Processing by Sensor Network Server>

Figure 25:
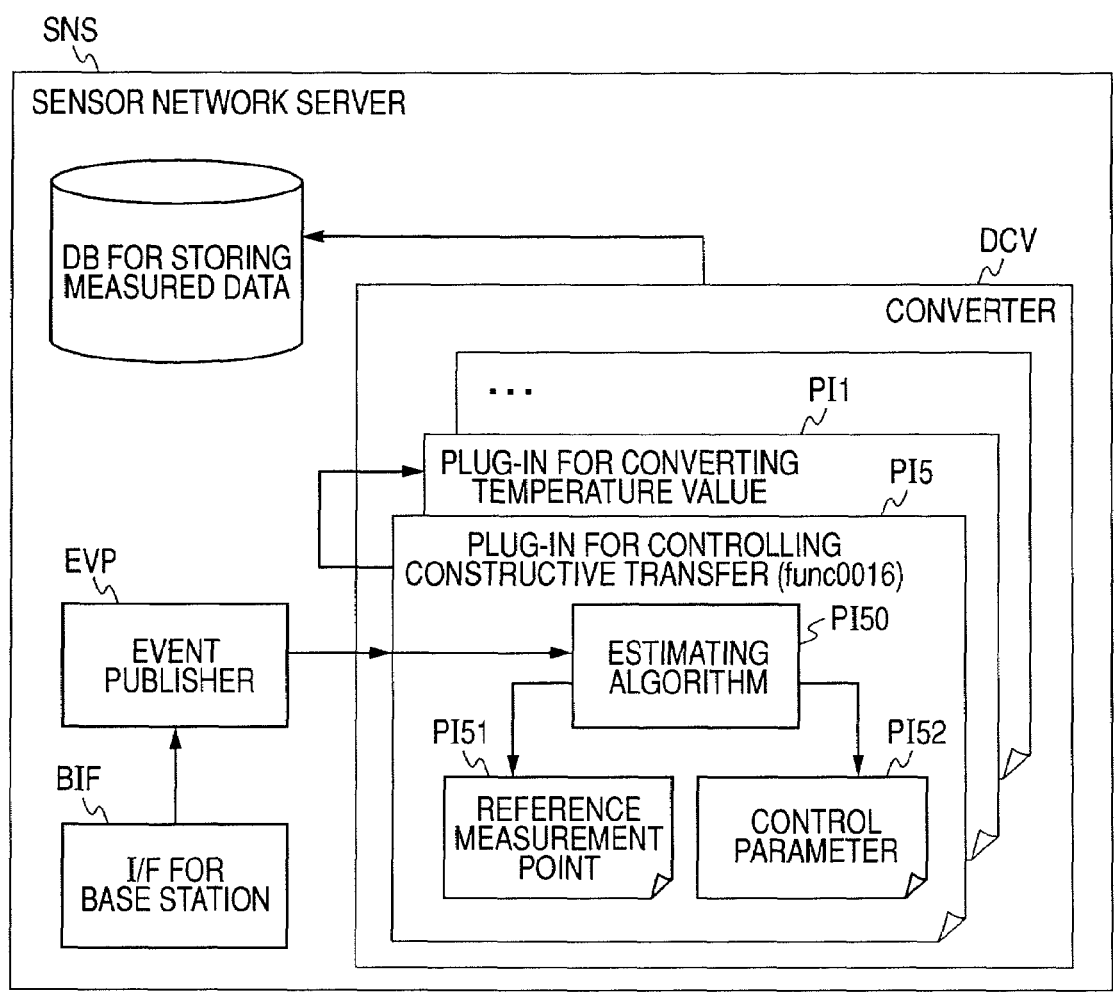
FIG. 25 similarly shows the second embodiment and is a block diagram showing a main part of functional elements of the sensor network server.

Next, FIG. 25 is a block diagram showing functional elements for processing constructive transfer executed by the sensor network server SNS.

An interface BIF for the base station sends the measured data received from the base station BST to the event publisher EVP. The event publisher EVP analyzes the measured data in the text format and determines plug-in called based upon ID (the MAC address) of the sensor node SN1. At this time, as the name (func0016) of called plug-in is written to the measured data for constructive transfer as shown in FIG. 24, the event publisher EVP calls the specified plug-in for constructive transfer PI5 and executes processing for conversion.

The plug-in for constructive transfer PI5 includes estimating algorithm PI50 having the similar logic to the operation for an estimated value of the sensor node SN1, a reference measurement point storage PI51 that stores the reference measurement points 0, 1 and control parameters PI52 in which parameters for control (for example, a sleep period) are held.

The plug-in for constructive transfer PI5 executes the following processing when it receives the measured data in the text format shown in FIG. 24.

First, the plug-in for constructive transfer reads a frequency of constructive transfer and acquires the number "i" of generated estimated values. Next, the plug-in reads the reference measurement point 0 (X0, T0) and the reference measurement point 1 (X1, T1) from the reference measurement point storage PI51. Next, the plug-in reads the sleep period from the control parameters PI52 and calculates generated time tm (m=1 to i) of an estimated value based upon measured time T1 of the reference measurement point 1. The sleep period of the sensor node SN1 may be also acquired from the sensor network manager NMG based upon the MAC address written to the measured data of the sensor node SN1.

Estimated values following the reference measurement point 1 (X1, T1) are generated as measurement points (Xm, Tm) by sequentially substituting m=1 to i for the time tm of the estimated value as the current time t in the expression (1). As a result, after the measurement points (Xm, Tm) operated based upon the estimating expression (1), the current measured value and a time stamp are converted to significant measured values acquired by adding a specific unit such as a centigrade scale to an output value of the sensor SS by the plug-in for converting a temperature value PI1, the significant measured values are stored in the database DB for measured data. An output destination of the plug-in for constructive transfer PI5 is set to the plug-in for converting a temperature value PI1.

As described above, the sensor network server SNS estimates and generates measured data which the sensor node SN1 does not actually transmit by using the same estimating expression in the sensor node SN1 and the sensor network server SNS.

As described above, in constructive transfer in the second embodiment, the maintenance interval of the sensor node SN1 and the life of equipment are extended by greatly reducing a frequency of radiocommunication of the sensor node SN1 driven by the battery BAT, further, traffic between the sensor network server SNS and the base station BST is greatly reduced, and their loads can be reduced. Hereby, the base station BST and the sensor network server SNS can increase available sensor nodes SN1 under them.

The example that the two reference measurement points are used is described above, however, the precision of the estimated value can be enhanced by using more reference measurement points.

Third Embodiment

Figure 26:
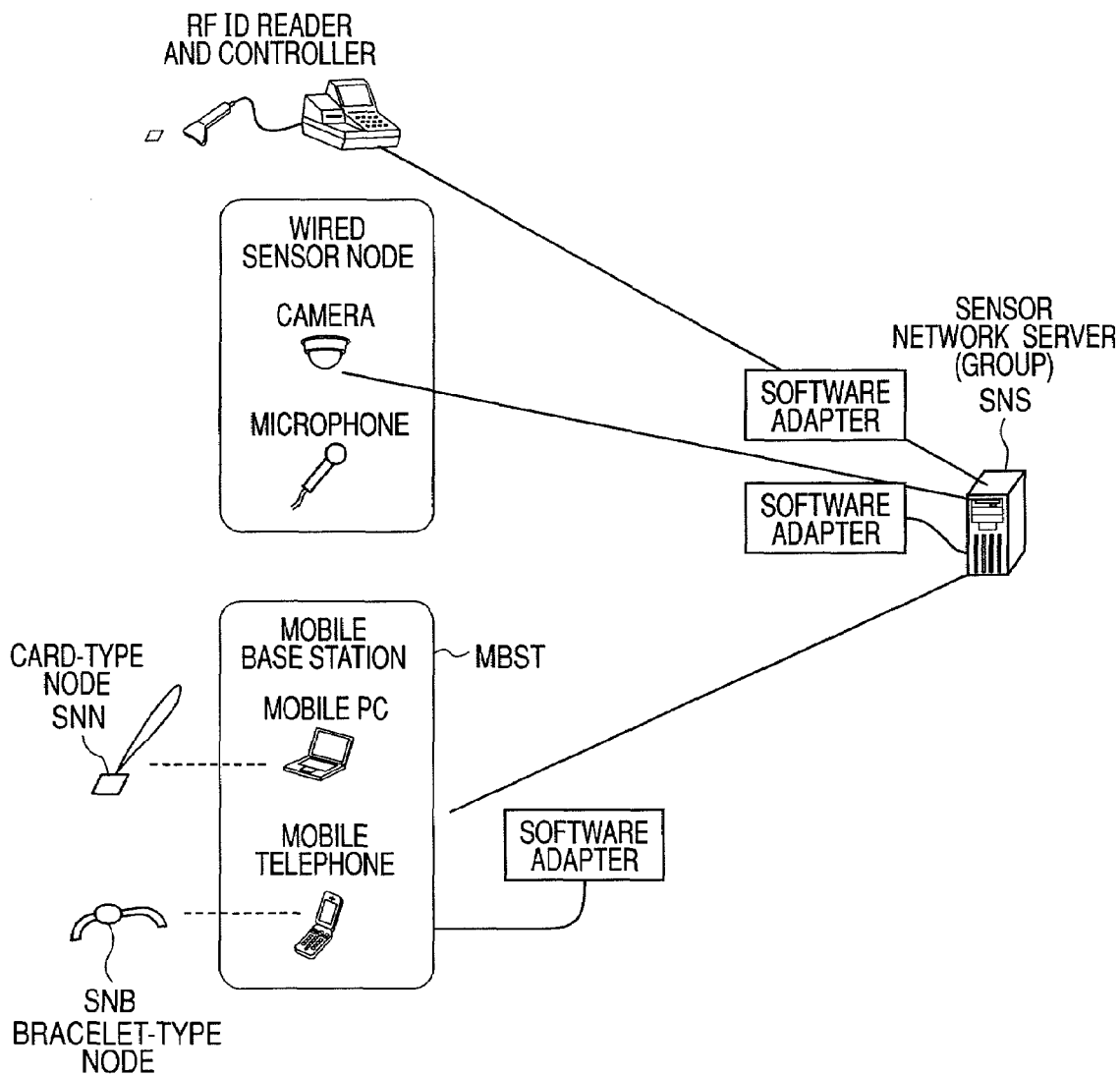
FIG. 26 is a block diagram showing a sensor network system equivalent to a third embodiment.

FIG. 26 shows a third embodiment and shows an example that a conversion engine CVEN utilizing the profile PF described in the first and second embodiments is applied not only to the gateway (the base station BST) in the first and second embodiments but to a sensor network server SNS and a mobile base station as a software adapter.

A wired sensor node such as an RF ID reader, a camera and a microphone is connected to single or plural sensor network servers SNS via a wired network WDN. The conversion engine CVEN using the profile PF in the first embodiment and a parser PSR are mounted in the sensor network server SNS to utilize measured data transmitted from the wired sensor node SN and the RF ID reader (or writer) in the sensor network server SNS.

The mobile base station MBST can be configured by building the conversion engine CVEN in the first embodiment or in the second embodiment and the parser PSR in a mobile computer and a mobile telephone as a software adapter. Under the mobile base station MBST, the sensor nodes SN1 to SNn depending upon radiocommunication in the first embodiment and the wired sensor node can be joined and for example, as shown in FIG. 26, a card-type sensor node SNN that notifies an individual identifier and a bracelet-type sensor node SNB that detects a pulse and body temperature can be used.

That is, the conversion engine CVEN described in the first or second embodiment and the parser PSR can be built in a computer located in an arbitrary position in a zone from a gateway of a sensor network system to the sensor network server SNS as the software adapter.

Hereby, the large-scale sensor network system can be configured easily and at a low cost without providing a dedicated computer as the base station BST.

Fourth Embodiment

Figure 27:
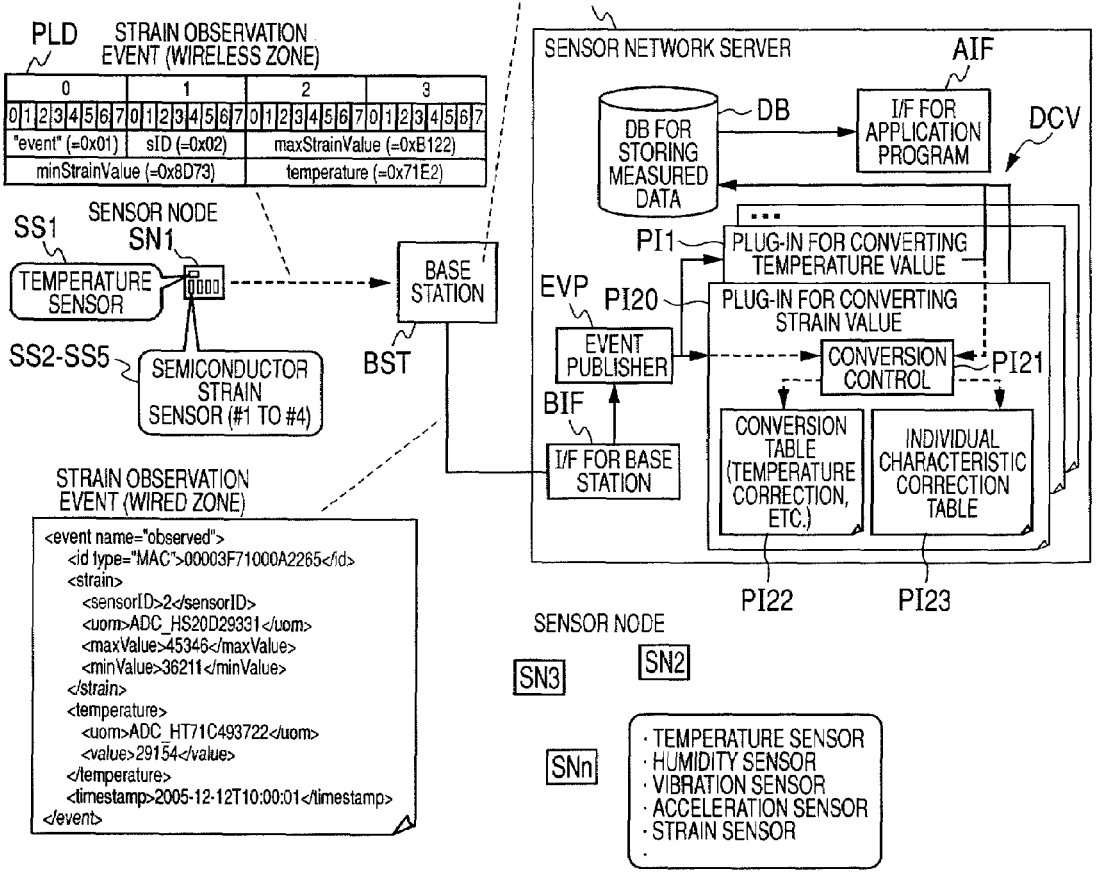
FIG. 27 is a block diagram showing a sensor network system equivalent to a fourth embodiment.

FIG. 27 shows a fourth embodiment. In the fourth embodiment, a temperature sensor and plural semiconductor strain sensors are provided as the sensor in the sensor node SN1 in the first embodiment, and format conversion and measured value conversion in a base station BST and a sensor network server SNS are executed using a node profile. The other configuration is similar to that in the first embodiment.

A sensor node SN1 has the temperature sensor SS1 and the plural semiconductor strain sensors SS2 to SS5. The other configuration is similar to that of the sensor node SN1 in the first embodiment.

The semiconductor strain sensor is a circuit mechanism that can be formed on a silicon substrate and that detects strain applying a principle of a piezoresistance in a silicon single crystal. Compared with a resistant-wire strain gauge-type strain sensor which was mainstream before, the semiconductor strain sensor has characteristics such as microminiature, very low power consumption and high sensitivity and is very suitable for mounting in a small-sized low power consumption sensor node.

For an object of mounting the plural strain sensors SS2 to SS5 in the sensor node SN1 as in this embodiment, it is supposed to measure different axial strain and to mount a spare sensor against breaking stress.

When the base station BST receives a connection notice from the sensor node SN1, the conversion engine CVEN and the parser PSR select a node profile PF1 corresponding to the sensor node SN1 as shown in FIGS. 1 and 2 in the first embodiment.

In the node profile PF1, it is written that one temperature sensor SS1 and the four semiconductor strain sensors SS2 to SS5 are mounted in the sensor node SN1 and parameter information related to operation is also written. In the node profile PF1, the gain (sensorGain) and the offset (sensorOffset) for calibrating each semiconductor strain sensor SS2 to SS5 (correcting individual difference) of the semiconductor strain sensors SS2 to SS5 can be set. The sensor node SN1 periodically senses, however, the sensor node executes operation based upon a threshold (thresholdBaseDriven) that the sensor node transmits a measured value for the first time when the measured strain value exceeds its maximum value or its minimum value.

In the node profile PF1, it is also written that a sensing interval (SensingInterval) which is an operational parameter and a threshold of measurement (maxThreshold, minThreshold) can be set. Further, a function of heartbeat (HeartBeat) can be also provided to the sensor node SN1 by forcedly transmitting measured data when fixed time elapses (maxTxInterval) even if a measured strain value does not exceed the threshold. As described above, the node profile PF1 not only plays a role of identifying a type of a packet with respect to each classification of sensor nodes but can play a role of providing information (of functions provided to the sensor node and of controllable parameters) required for an administrator of a sensor network system to control or to manage the sensor node by defining the functions proper to the sensor node and controllable parameters. A very handy interface for management for the administrator of the sensor network system can be provided.

Concretely, in the sensor network server SNS shown in FIG. 3 in the first embodiment, the interface for management MIF can provide the information of the functions and the parameters to the administrator via the sensor network manager NMG in addition to the run time information of each sensor node SN1 to SNn by distributing the node profile PF1 from the profile manager PMG to the sensor network manager NMG.

The sensor node SN1 transmits a connection notice under the base station BST and the base station BST selects the node profile PF1 applied to the sensor node SN1 by the conversion engine CVEN and the parser PSR as in the first embodiment. A format of a payload PLD in a wireless network WLN is similar to that in the first embodiment. The base station BST sets a conversion definition of the following measured data based upon the node profile PF1. The base station BST notifies the sensor network server SNS of it as in the first embodiment when the base station receives a connection notification packet.

The sensor network server SNS records that an MAC address of the sensor node SN1 that transmits the connection notice is under the base station BST in the sensor network manager NMG. Further, the sensor network server manages that the sensor node SN1 having the MAC address is under the base station BST.

In a sensor device such as the semiconductor strain sensors SS2 to SS5, individual difference in an output value of the sensor, zero-balance and hysteresis may occur depending upon its manufacturing process and external environment. For precise measurement, a compensating circuit such as Wheatstone bridge is often built in the sensor device beforehand, however, a case that it is desirable to configure the sensor node and the sensor device by as simple and low-priced hardware as possible is also supposed. The semiconductor strain sensors SS2 to SS5 have a characteristic that an output value of the sensor varies depending upon temperature. The compensating circuit can be also used to correct this phenomenon, however, in this embodiment, in the sensor node SN1, the temperature sensor SS1 is mounted together with the semiconductor strain sensors SS2 to SS5 (without a compensating circuit) and on the side of the sensor network server SNS, plug-in PI20 for making conversion to SI (strain) after making the correction of adding temperature to a strain value is prepared. A converter DCV of the sensor network server SNS has plug-in for converting a temperature value PI1 as in the first embodiment.

When the sensor network server SNS receives measured data from the sensor node SN1 converted to the text format in the base station BST, an event publisher EVP calls the plug-in for converting a strain value PI20 and the plug-in for converting a temperature value PI1 respectively shown in FIG. 27 and instructs them to convert the respective values.

The converter DCV converts an output value of the temperature sensor SS1 to SI using the plug-in for converting a temperature value PI1, applies temperature correction to a strain value based upon the output of the plug-in for converting a temperature value PI1 and converts the corrected strain value to SI using the plug-in for converting a strain value PI20. Therefore, the plug-in for converting a strain value PI20 has a conversion controller PI21 that acquires the output value (a temperature value: SI) from the plug-in for converting a temperature value PI1 and controls the conversion of a strain value to SI, a conversion table for correcting a strain value PI22 and an individual characteristic correction table PI23 that stores a corrected value according to an individual characteristic based upon ID of the sensor node SN1 written to measured data.

The conversion controller PI21 converts an output value of measured data from the strain sensors SS2 to SS5 to SI based upon preset conversion definition information. Next, the conversion controller PI21 acquires a temperature value from the plug-in for converting a temperature value PI1 and applies temperature correction to the strain value converted to SI. Finally, the conversion controller PI21 refers to the individual characteristic correction table PI23 based upon ID of the sensor node SN1 included in the measured data and acquires a correction value proper to the sensor node SN1. The conversion controller PI21 further corrects and outputs the strain value with the proper correction value and stores it in the database DB.

As described above, the plug-in of the converter DCV in the sensor network server SNS also can process output values of various sensor nodes by selecting conversion definition information according to an identifier such as ID of the sensor node SN1 like the plug-in of the conversion engine CVEN in the base station BST.

Particularly, plural processes including not only the conversion of an output value to SI but correction according to an individual characteristic of the sensor node and compensation based upon output values of plural sensors SS can be defined to the plug-in.

The sensor node SN1 is small size 1 cm or less square, however, slight temperature distribution may also occur on a substrate of the senor node SN1 depending upon application and environment. In such a case, it is desirable that the temperature sensor SS1 and the semiconductor strain sensors SS2 to SS5 are arranged as close as possible or touchably on the substrate. When the temperature sensor SS1 is further smaller-sized than the strain sensors SS2 to SS5, the temperature sensor circuit may be also built in the strain sensor circuit by circuit mounting technique.

When a temperature sensor is mounted in another sensor node SN2 installed close even if the temperature sensor SS1 is not mounted in the same sensor node as the semiconductor strain sensors SS2 to SS5 in the sensor node SN1, the sensor node SN1 may also make the temperature correction of a strain value using its temperature value. In this case, as in the second embodiment, the conversion engine CVEN of the base station BST has only to define the plug-in called in the sensor network server SNS in measured data in the text format.

For another effect of simultaneously measuring a strain value and a temperature value, the precise measurement of a physical phenomenon of a measured object can be given. For example, to evaluate the durability of structure installed in severe environment including exposure to high temperature and low temperature, evaluation in consideration of both strain and temperature is required. The effect of measurement can be more enhanced by simultaneously collecting various physical values such as humidity, vibration and acceleration except temperature. As a method of evaluating the durability using these various physical values may vary depending upon which of reinforcing bars, concrete and wood the structure is made of, it is conceivable that evaluation algorithm corresponding to each material is provided to the plug-in. Sensors that measure these various physical values may be also mounted in the sensor node SN1 and may be also mounted in another sensor node SN2 installed close.

Fifth Embodiment

Figure 28:
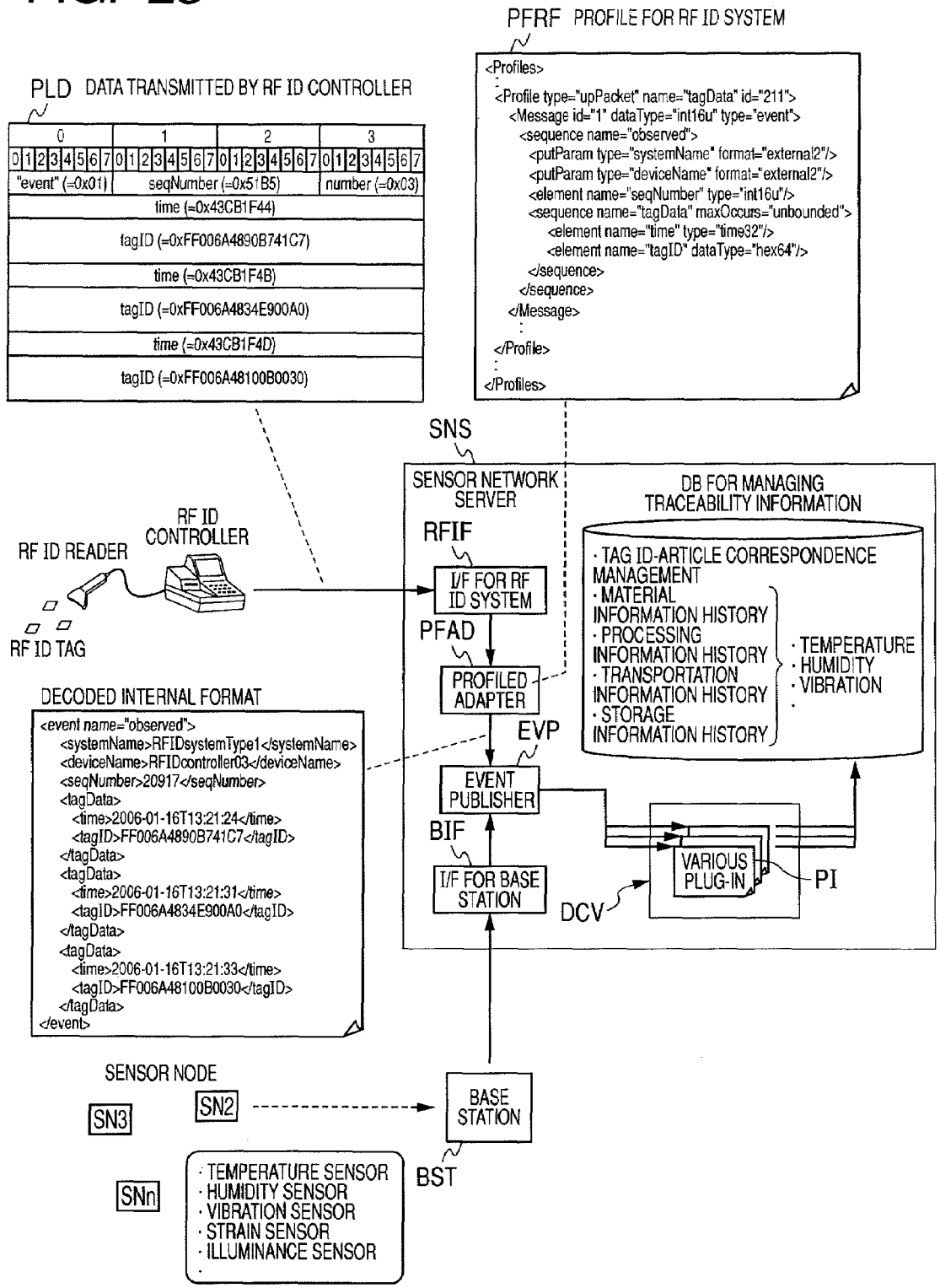
FIG. 28 is a block diagram showing a sensor network system equivalent to a fifth embodiment.

FIG. 28 shows a fifth embodiment. In the fifth embodiment, an interface RFIF for an RF ID system connected to an RF ID controller and a profile adapter PFAD that applies a profile PFRF to the output of the interface RFIF for the RF ID system and is connected to an event publisher EVP of a sensor network system are added to the sensor network server SNS described in the first embodiment.

That is, FIG. 28 shows an example that a conversion engine CVEN that utilizes a profile PF is applied to not only the gateway (the base station BST) in the first or second embodiment to but the sensor network server SNS and a mobile base station as a software adapter.

The RF ID controller is connected to an RF ID reader/writer that reads/writes an RF ID tag. A passive RF ID tag is interior to an active sensor chip in a function, however, the RF ID tag exercises its power in article traceability because it is low-priced and handy, and is being introduced as a new IT system in place of a bar-code system. Higher article traceability and application to production control are enabled by linking such an RF ID system and the sensor network system closely.

For example, when a merchandise on which the passive RF ID tag is stuck is forwarded, history information including the information of the material and processing information in the manufacture is managed in a database DB of the sensor network server SNS together with an identifier (tagID) of the RF ID tag. In addition, as information such as temperature, humidity and vibration transmitted from a sensor node is fully reflected in the database DB of the sensor network server SNS, the history information such as environment in transportation and storage is automatically stored.

<Connection to RF ID System Using Software Adapter>

A typical RF ID system includes the RF ID tag, the RF ID reader and RF ID controller.

In a viewpoint as a system, the configuration of the wireless sensor network WLN described in the first embodiment and that of the RF ID system have many similar points. However, it is not easy to link or integrate these system in the viewpoint of individual element technique and mounting technology. As for a radiocommunication mode, specifications for radiocommunication such as ZigBee and IEEE802.15.4 are most powerful in a sensor network. In the meantime, a specification for radiocommunication widely used for RF ID is near field communication (NFC). NFC is fully different from ZigBee and IEEE802.15.4 and mutual communication is impossible under the different specifications. The RF ID reader and the RF ID controller can be regarded as similar to the base station BST of the sensor network system as a role in the system, however, they are often provided as dedicated hardware and software.

Therefore, in their connection to the sensor network system, only a packet according to a specific specification can be transmitted/received and besides, an additional user program cannot be often installed. Therefore, it cannot be expected that the RF ID reader and the RF ID controller have a function as the base station BST of the sensor network system shown in FIG. 2.

Then, as shown in FIG. 28, a software adapter that provides a function of the conversion engine CVEN in the base station BST shown in FIG. 2 in the first embodiment is prepared as a profiled adapter PFAD and is built in the sensor network server SNS. Hereby, the RF ID system and the sensor network system can be connected with minimum labor.

The profiled adapter PFAD can directly encode and decode a packet under a specific specification transmitted/received on the side of the sensor network server SNS by the RF ID controller by configuring it like the conversion engine CVEN in the first embodiment and setting the profile PFRF for the RF ID system. That is, the profiled adapter PFAD converts data from the interface RFIF for the RF ID system to measured data in a text format based upon the profile PFRF and sends the measured data to the event publisher EVP. Hereby, a detected value by the RF ID controller can be handled like an output value of a sensor SS. A converter DCV has only to select specific plug-in based upon an identifier such as ID of the RF ID controller and convert to significant information.

Normally, as the RF ID controller has an Ethernet (trademark) interface, the interface for the RF ID system is a typical TCP/IP socket interface opposite to the RF ID controller. When the RF ID reader and the RF ID controller comply with a specification for TCP-IP communication, it is also conceivable that the RF ID reader directly communicates with the sensor network server without using the RF ID controller. In this case, the profiled adapter PFAD also functions as the RF ID controller.

A case that the RF ID controller uses not a binary format but a text format for communication with a host system is also conceivable. The whole invention has been described with decoding binary data into text data as a premise, however, a profile for performing mutual conversion may be also defined so that the sensor network server according to the invention having a specific mode can handle a text format defined according to another specification. It is evident that the invention can be also applied to such application by slightly changing the description of a profile and a mechanism for realization.

For a small-sized low power consumption sensor device suitable for mounting as the wireless sensor nodes SN1 to SNn, a temperature sensor, a humidity sensor, an acceleration sensor, a shock sensor, a semiconductor strain sensor, a sound wave sensor (a microphone), an optical sensor and a magnetic sensor are made practicable.

In the meantime, a sensor device which is difficult to small-size or to reduce power consumption exists because of a principle of measurement and others. For example, in the case of the measurement of dust and gas, it is considered that it is difficult to realize a sensor device the outside dimension of which is a few mm square and the power consumption of which is a few mW though a concrete measurement object and measurement precision are slightly different. Besides, also when an image and a dynamic image are sensed, the size of measurement data increases even if the sensor device itself can be small-sized and the power consumption can be reduced and as considerable resources are required for data processing or communication, it is not suitable to mount the sensor device in a small-sized low power consumption sensor node having large constraint on resources such as a microcomputer and a memory.

When such a sensor device is used, it is desirable that the sensor device is not mounted in a small-sized low power consumption wireless node but is provided as an AC fed box-type measuring device. In the case of the box-type measuring device, a communication interface may be also naturally wireless, however, a wire communication interface such as that in 10/100 BASE-T Ethernet (trademark) and a specification for a factory automation (FA) system may be also used. In such a case, no equipment equivalent to the base station BST in the first embodiment exists and a sensor node having the wire communication interface may also directly communicate with a sensor network server. In such a case, a method of mounting the profile function in the fifth embodiment as the software adapter in the sensor network server SNS is also effective.

As described above, the invention can be applied to the sensor network system where radiocommunication is made between the sensor node and the base station and wire communication is made between the base station and the server.

What is claimed is:

1. A sensor network system comprising:
a gateway connected to a plurality of sensor nodes via a network; and
a server connected to the gateway via a network,
wherein the sensor node includes a communication unit that transmits at least one measured value sensed by at least one sensor and an identifier of the sensor node as measured data,
wherein the gateway includes:
a first communication controller that receives the measured data from the sensor node; and
a second communication controller that transmits the received measured data to the server,
wherein the server has a database that stores the measured data received from the network,
wherein there are provided a conversion definition information manager that accepts, holds and manages conversion definition information input from the server, a user terminal or another communication unit, a conversion definition information selector that selects conversion definition information corresponding to an identifier included in the measured data out of conversion definition information held by the conversion definition information manager and a conversion processor that applies a format conversion process set in the selected conversion definition information to the measured data between the gateway and the server or to the gateway or to the server, and wherein the database stores the converted measured data.

2. The sensor network system according to claim 1, wherein the measured data is binary and the conversion definition information includes first conversion definition information for converting the binary measured data to measured data in a different format, wherein the conversion processor converts the binary measured data to measured data in the different format based upon the selected first conversion definition information when the first conversion definition information is selected, and wherein the database stores the converted measured data.

3. The sensor network system according to claim 1, wherein the conversion definition information includes second conversion definition information for adding and converting a unit to the received measured data, wherein the conversion definition information manager accepts, stores and manages the second conversion definition information input from the server or the user terminal or another communication device, wherein the conversion definition information selector selects second conversion definition information corresponding to an identifier included in the measured data out of a plurality of second conversion definition information held by the conversion definition information manager, wherein the conversion processor adds and converts a unit to the measured data based upon the selected second conversion definition information, and wherein the database stores the converted measured data.

4. The sensor network system according to claim 1, wherein the conversion definition information selector selects the conversion definition information based upon:

a conversion definition information relating table for relating an identifier included in the measured data and selective information for selecting the conversion definition information; and the selective information corresponding to the identifier included in the measured data.

5. The sensor network system according to claim 4, wherein, when the selective information indicates that conversion definition information corresponding to an identifier included in measured data is preset, the conversion definition information selector selects the conversion definition information corresponding to the identifier.

6. The sensor network system according to claim 4, wherein, when the selective information indicates conversion definition information based upon data included in measured data, the conversion definition information selector selects the conversion definition information indicated by the data in a specific position of the measured data.

7. The sensor network system according to claim 3, wherein the sensor node includes:

a measuring unit that is activated from a sleep condition in a specific cycle and acquires a value measured by a sensor;

an estimated value arithmetic unit that operates an estimated value of the sensor when the value measured by the sensor is acquired;

a determining unit that determines whether difference between the measured value and the estimated value is within a preset allowable range or not;

a constructive transfer counter that increments a frequency of constructive transfer when the difference between the measured value and the estimated value is within the allowable range; and a transmitter that transmits the measured value and the frequency of constructive transfer as measured data when the difference between the measured value and the estimated value exceeds the allowable range, wherein the conversion definition information selector selects the first conversion definition information including an instruction to generate estimated values according to the frequency of constructive transfer when the measured data is received from the sensor node, wherein the server has a second conversion processor that adds and converts a unit to the received measured data, and wherein the second conversion processor operates respective time corresponding to the frequency of constructive transfer based upon the received time of the last measured data when the instruction to generate the estimated values according to the frequency of constructive transfer is included in the received measured data, operates an estimated value of the sensor at the operated time, and adds and converts a unit to measured data including the operated estimated value with respect to each operated time based upon the preset second conversion definition information.

8. The sensor network system according to claim 2, wherein the sensor node includes:

a measuring unit that is activated from a sleep condition in a specific cycle and acquires a value measured by a sensor;

a communication condition determining unit that transmits the measured value to a gateway and determines whether a condition of communication with the gateway is satisfactory or not;

a data storage that stores the measured value when communication with the gateway is not made; and a batch transmitter that collectively transmits the past measured value stored in the data storage in addition to the current measured value acquired by the measuring unit when communication with the gateway is made, wherein the conversion definition information selector selects the first conversion definition information required to process the current measured data and the past measured data when the measured data is received from the sensor node, wherein the server has a second conversion processor that adds and converts a unit to the received measured data, and wherein the second conversion processor adds and converts a unit to every measured value included in the measured data based upon the preset second conversion definition information when the received measured data includes the plurality of measured values.

9. The sensor network system according to claim 2, wherein the gateway includes the conversion definition information selector and the conversion processor.

10. The sensor network system according to claim 2, wherein the server includes the conversion definition information selector and the conversion processor.

11. The sensor network system according to claim 1, wherein the conversion processor adds semantic information of a measured value included in the binary measured data to measured data in a text format based upon the conversion definition information.

12. The sensor network system according to claim 2,
wherein the first conversion definition information includes information about the classification of the sensors provided to the sensor node or a function of the sensor or a processing for the value measured by the sensor.

13. The sensor network system according to claim 3,
wherein the sensor node includes a semiconductor strain sensor, and
wherein a communication unit of the semiconductor strain sensor transmits a value measured by the semiconductor strain sensor as measured data.

14. The sensor network system according to claim 13,
wherein the sensor node includes a temperature sensor, and
wherein the conversion processor corrects the measured data from the semiconductor strain sensor using measured data from the temperature sensor.

15. The sensor network system according to claim 13,
wherein the sensor node includes at least one of a temperature sensor, a humidity sensor, a vibration sensor and an acceleration sensor, and
wherein the conversion processor evaluates the durability of an object of measurement by the semiconductor strain sensor using the measured data from the semiconductor strain sensor and measured data from at least one of the humidity sensor, the vibration sensor and the acceleration sensor.

* * * * *